United States Patent
Park et al.

(10) Patent No.: US 11,785,607 B2
(45) Date of Patent: Oct. 10, 2023

(54) METHOD AND APPARATUS FOR TRANSMITTING CONTROL INFORMATION IN WIRELESS CELLULAR COMMUNICATION SYSTEM

(71) Applicant: Samsung Electronics Co., Ltd., Gyeonggi-do (KR)

(72) Inventors: Sungjin Park, Incheon (KR); Jeongho Yeo, Gyeonggi-do (KR); Younsun Kim, Gyeonggi-do (KR); Jinyoung Oh, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/476,482

(22) PCT Filed: Jan. 3, 2018

(86) PCT No.: PCT/KR2018/000134
§ 371 (c)(1),
(2) Date: Jul. 8, 2019

(87) PCT Pub. No.: WO2018/128394
PCT Pub. Date: Jul. 12, 2018

(65) Prior Publication Data
US 2020/0022115 A1 Jan. 16, 2020

(30) Foreign Application Priority Data

Jan. 6, 2017 (KR) .................. 10-2017-0002166
Feb. 10, 2017 (KR) .................. 10-2017-0018732

(51) Int. Cl.
*H04W 72/00* (2023.01)
*H04L 5/00* (2006.01)
(Continued)

(52) U.S. Cl.
CPC ....... *H04W 72/23* (2023.01); *H04W 72/0453* (2013.01); *H04L 5/00* (2013.01); *H04W 72/00* (2013.01)

(58) Field of Classification Search
CPC ... H04L 1/0006; H04L 5/0044; H04L 5/0064; H04L 5/0082; H04L 5/0087;
(Continued)

(56) References Cited

U.S. PATENT DOCUMENTS

2013/0010737 A1* 1/2013 Ng .................. H04L 5/0094
370/329
2013/0039272 A1* 2/2013 Chen .................. H04W 76/25
370/328
(Continued)

FOREIGN PATENT DOCUMENTS

KR 1020180047886 5/2018
KR 1020180049974 5/2018

OTHER PUBLICATIONS

PCT/ISA/210 Search Report issued on PCT/KR2018/000134, pp. 5.
(Continued)

*Primary Examiner* — Michael Thier
*Assistant Examiner* — Prince A Mensah
(74) *Attorney, Agent, or Firm* — The Farrell Law Firm, P.C.

(57) ABSTRACT

The present invention relates to a communication technique for convergence of an IoT technology and a 5G communication system for supporting a higher data transmission rate beyond a 4G system, and a system therefor. The present disclosure can be applied to an intelligent service (for example, a smart home, a smart building, a smart city, a smart car or connected car, health care, digital education, retail business, security and safety-related service, etc.) on the basis of a 5G communication technology and an IoT-
(Continued)

related technology. A method for communicating by a base station according to the present invention comprises transmitting control information relating to at least two services to a terminal; and transmitting data relating to the at least two services to the terminal, wherein at least one of a control region for transmitting the control information and a data region for transmitting the data may include at least two frequency bandwidths corresponding to each of the at least two services.

16 Claims, 21 Drawing Sheets

(51) Int. Cl.
*H04W 72/23* (2023.01)
*H04W 72/0453* (2023.01)

(58) Field of Classification Search
CPC ... H04W 72/00; H04W 72/04; H04W 72/042; H04W 72/0453
See application file for complete search history.

(56) References Cited

U.S. PATENT DOCUMENTS

| | | | |
|---|---|---|---|
| 2014/0086188 A1 | 3/2014 | Hoymann | |
| 2016/0128028 A1* | 5/2016 | Mallik | H04L 5/0053 370/336 |
| 2017/0230994 A1* | 8/2017 | You | H04L 5/0053 |
| 2017/0302419 A1* | 10/2017 | Liu | H04L 5/0091 |
| 2017/0332359 A1* | 11/2017 | Tsai | H04B 7/0639 |
| 2018/0063858 A1* | 3/2018 | Au | H04L 1/0006 |
| 2018/0063865 A1* | 3/2018 | Islam | H04L 5/0087 |
| 2018/0092070 A1* | 3/2018 | Liao | H04L 1/0038 |
| 2018/0092104 A1* | 3/2018 | Sheng | H04L 5/0064 |
| 2018/0098307 A1* | 4/2018 | Yang | H04L 5/0094 |
| 2018/0124753 A1* | 5/2018 | Sun | H04W 72/042 |
| 2018/0167967 A1* | 6/2018 | Li | H04W 72/1268 |

OTHER PUBLICATIONS

PCT/ISA/237 Written Opinion issued on PCT/KR2018/000134, pp. 6.

Samsung, 3GPP TSG RAN WG1 Meeting #86bis, R1-1609059, Lisbon, Portugal, Oct. 1, 2016, "Multiplexing URLLC and eMBB in DL", pp. 7.

ZTE, ZTE Microeletronics, 3GPP TSG-RAN WG1 Meeting #86bis, R1-1608957, Lisbon, Portugal, Oct. 1, 2016, "URLLC and eMBB frame structure and multiplexing", pp. 9.

LG Electronics, 3GPP TSG RAN WG1 Meeting #87, R1-1611833, Reno, USA, Nov. 5, 2016, "Discussions on data and control multiplexing for NR", pp. 5.

Samsung, 3GPP TSG RAN WG1 Meeting #87, R1-1612544, Reno, USA, Nov. 4, 2016, "URLLC Control Channel", pp. 5.

* cited by examiner

METHOD AND APPARATUS FOR TRANSMITTING CONTROL INFORMATION IN WIRELESS CELLULAR COMMUNICATION SYSTEM

PRIORITY

This application is a National Phase Entry of PCT International Application No. PCT/KR2018/000134 which was filed on Jan. 3, 2018, and claims priority to Korean Patent Application Nos. 10-2017-0002166 and 10-2017-0018732, which were filed on Jan. 6, 2017 and Feb. 10, 2017, respectively, the content of each of which is incorporated herein by reference.

TECHNICAL FIELD

The disclosure relates to a wireless communication system, and it relates to a method and an apparatus for smoothly providing a service in a communication system. More particularly, the disclosure relates to a method and an apparatus for transmitting control information in a communication system.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G Network" communication system or a "post LTE System."

Implementation of the 5G communication system in ultra-high frequency (mmWave) bands, e.g., 60 GHz bands, is being considered in order to accomplish higher data rates. To mitigate a path loss of the radio waves and increase the transmission distance on the radio waves in the ultrahigh frequency, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, recently there has been research on a sensor network, machine-to-machine (M2M) communication, machine type communication (MTC), and so forth. Such an IoT environment may provide intelligent Internet technology services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antennas, which correspond to 5G communication technology. Application of a cloud radio access network (cloud RAN) as the above-described big data processing technology may also be considered to be an example of convergence between the 5G technology and the IoT technology.

In the 5G system, in comparison with the existing 4G system, support of various services has been considered. For example, the most representative services may be enhanced mobile broadband (eMBB), ultra-reliable and low latency communication (URLLC), massive machine type communication (mMTC), evolved multimedia broadcast/multicast service (eMBMS), and so forth. Further, a system providing the URLLC services may be called an URLLC system, a system providing the eMBB services may be called an eMBB system, and a system providing the mMTC services may be called an mMTC system. Further, the terms "service" and "system" may be used interchangeably.

DISCLOSURE OF INVENTION

Technical Problem

In a communication system, a plurality of services may be provided to a user, and in order to provide such services to a user, there is a need for a method capable of providing services at the same time interval to suit their respective features and an apparatus using the method.

The disclosure has been made in order to solve the above-described problems, and an embodiment of the disclosure provides a method and an apparatus for simultaneously providing different types of services.

Further, an embodiment of the disclosure provides a method and an apparatus capable of obtaining different types of services at the same time interval by adaptively supporting an existing type of service through identifying whether a specific type of service occurs in the case of simultaneously providing the different types of services.

Further, an embodiment of the disclosure provides a method by a terminal for efficiently identifying control information transmitted by a base station.

Technical tasks to be accomplished by the disclosure are not limited to those described above, and unmentioned or other technical tasks will be clearly understood by those of ordinary skill in the art to which the disclosure pertains from the following description.

Solution to Problem

According to an embodiment of the disclosure, a communication method by a base station includes transmitting, to a terminal, control information on at least two services; and transmitting, to the terminal, data for the at least two services, wherein at least one of a control region for transmitting the control information or a data region for transmitting the data includes at least two frequency bandwidths corresponding to each of the at least two services.

The control region may be allocated to some parts of the frequency bandwidths, and another parts of the frequency bandwidths to which the control region is not allocated among the frequency bandwidths may be allocated to the data region.

The control information may include a first control information type for a first service and a second control information type for a second service.

The number of bits of the first control information type may be equal to the number of bits of the second control information type.

The second control information type may include information related to the first control information type and the second service.

According to an embodiment of the disclosure, a communication method by a terminal includes receiving, from a base station, control information on at least two services; and receiving, from the base station, data for the at least two services, wherein at least one of a control region for transmitting the control information or a data region for transmitting the data includes at least two frequency bandwidths corresponding to each of the at least two services.

The control region may be allocated to some parts of the frequency bandwidths, and another parts of the frequency bandwidths to which the control region is not allocated among the frequency bandwidths may be allocated to the data region.

Receiving the control information from the base station may include decoding a first control information type in a first control region and decoding a second control information type in a second control region, in case that the control region includes the first control region corresponding to a first service and the second control region corresponding to a second service.

Further, receiving the control information from the base station may include decoding the first control information type in the frequency bandwidths, in case that a ratio of the first control region to all the frequency bandwidths is equal to or larger than a predetermined threshold value.

The communication method by the terminal may further include decoding a first control information type corresponding to a first data region in, in case that the data region includes a first data region corresponding to a first service and a second data region corresponding to a second service and data scheduled to the terminal is allocated to the first data region.

According to an embodiment of the disclosure, a base station includes a transceiver and a controller, the controller being configured to transmit, to a terminal, control information on at least two services; and to transmit, to the terminal, data for the at least two services, wherein at least one of a control region for transmitting the control information or a data region for transmitting the data includes at least two frequency bandwidths corresponding to each of the at least two services.

According to an embodiment of the disclosure, a terminal includes a transceiver and a controller, the controller being configured to receive, from a base station, control information on at least two services; and to receive, from the base station, data for the at least two services, wherein at least one of a control region for transmitting the control information or a data region for transmitting the data includes at least two frequency bandwidths corresponding to each of the at least two services.

Advantageous Effects

According to an embodiment of the disclosure, data can be effectively transmitted using different types of services in a communication system.

Further, according to an embodiment of the disclosure, a method in which data transmissions between different kinds of services coexist can be provided to satisfy requirements according to respective services, to reduce delay of the transmission time, or to efficiently use at least one of frequency-time and space resources.

Further, according to an embodiment of the disclosure, it is possible to provide a method and an apparatus capable of obtaining different types of services in the same time interval by adaptively supporting an existing type service through identifying whether a specific type service occurs in the case of simultaneously providing the different types of services.

Further, according to an embodiment of the present disclosure, it is possible to provide a method by a terminal for efficiently identifying control information transmitted by a base station.

Technical tasks to be accomplished by the disclosure are not limited to those as described above, and unmentioned or other technical tasks will be clearly understood by those of ordinary skill in the art to which the disclosure pertains from the following description.

MODE FOR THE INVENTION

Figure 1:
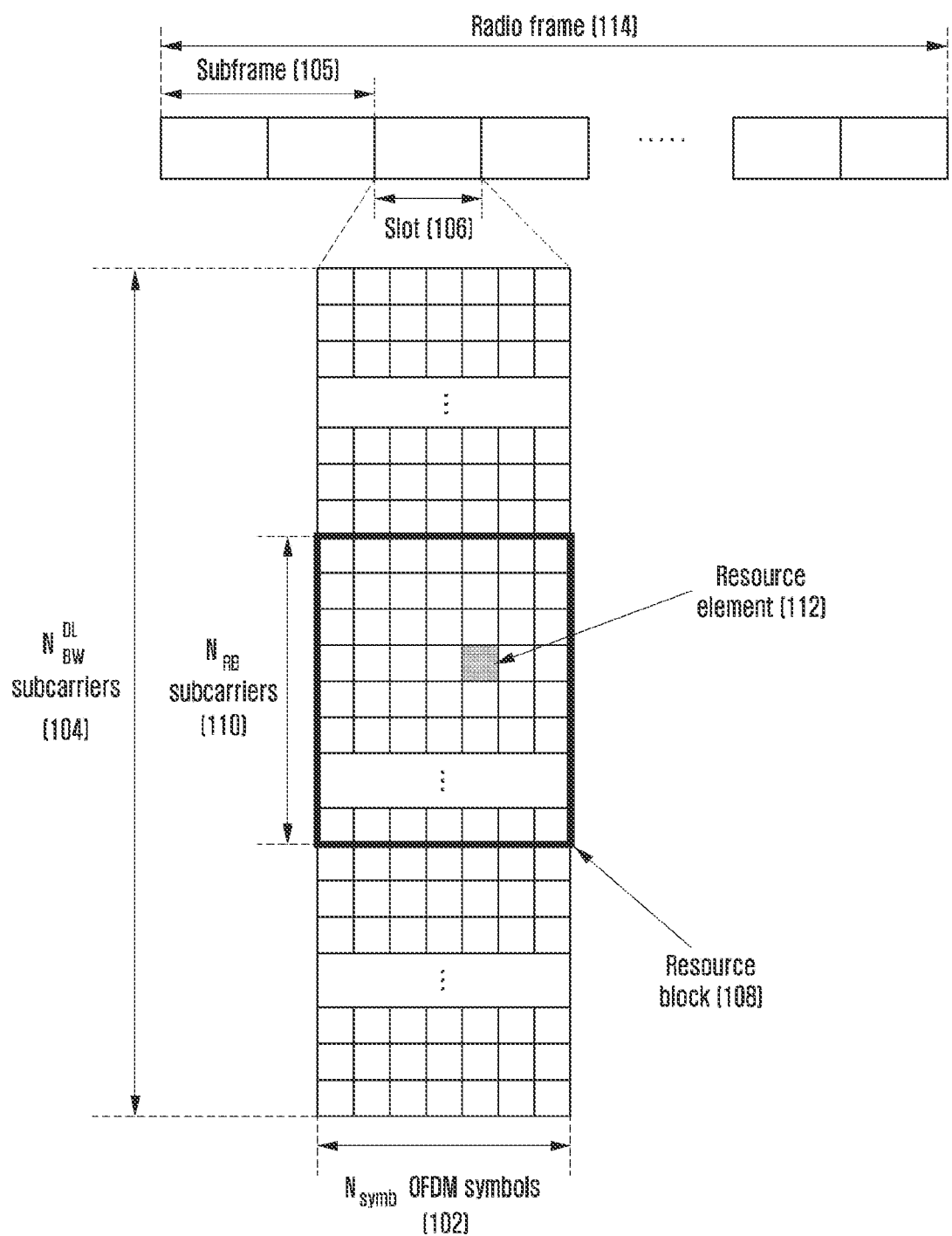
FIG. 1 is a diagram illustrating a downlink time frequency domain transmission structure of an LTE or LTE-A system.

Hereinafter, embodiments of the disclosure will be described in detail with reference to the accompanying drawings.

In explaining the embodiments, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card. Further, in an embodiment, "~unit" may include one or more processors.

A wireless communication system was initially developed for the purpose of providing a voice-oriented service, but it has been expanded to, for example, a broadband wireless communication system that provides a high-speed and high-quality packet data service like communication standards, for example 3GPP high speed packet access (HSPA), long term evolution (LTE) or evolved universal terrestrial radio access (E-UTRA), LIE-Advanced (LTE-A), 3GPP2 high rate packet data (HRPD), ultra-mobile broadband (UMB), and IEEE 802.16e. Further, for the 5th generation wireless communication system, 5G or new radio (NR) communication standards have been made.

In a wireless communication system including the 5th generation, as described to above, at least one service of enhanced mobile broadband (eMBB), massive machine type communications (mMTC), and ultra-reliable and low-latency communications (URLLC) may be provided to a terminal. The above-described services may be provided to the same terminal during the same time period. In an embodiment, among the above-described services, eMBB may be aimed at high-speed transmission of high-capacity data, mMTC may be aimed at minimization of a terminal power and connection among plural terminals, and URLLC may be aimed at high reliability and low delay, but they are not limited thereto. The three kinds of services as described above may be primary scenarios in an LTE system or post-LIE 5G/new radio or next radio (NR) systems. In an embodiment, a coexistence method between eMBB and URLLC or between mMTC and URLLC, and an apparatus using the method, are exemplarily described, but the disclosure is not limited thereto. For example, the disclosure could be applied even with respect to an environment in which there is coexistence between a service requiring high-speed transmission of different high-capacity data and a service aimed at ultrahigh reliability and low latency.

A situation may occur in which a base station should transmit URLLC data at a specific transmission time interval (TTI) in case that the base station is scheduled to transmit data that corresponds to an eMBB service to a certain terminal at the TTI. In this case, the base station may not transmit a part of the eMBB data in a frequency bandwidth in which the eMBB data has already been scheduled and transmitted, but the base station may transmit the generated URLLC data in the frequency bandwidth. The eMBB-scheduled terminal and the URLLC-scheduled terminal may be the same terminal or different terminals. In this case, because a part of the eMBB data that has already been scheduled and transmitted may not be transmitted, there is an increased possibility that the eMBB data may be damaged. Accordingly, it is necessary to determine a method for processing a signal received in the eMBB-scheduled terminal or the URLLC-scheduled terminal and a method for receiving the signal in case that transmission of the URLLC data is scheduled at the specific TTI, even though the data corresponding to the eMBB service is scheduled to the terminal at the TTI.

Accordingly, in an embodiment, a coexistence method between different services will be described, by which information can be transmitted according to the respective services if information is scheduled according to eMBB and URLLC through sharing of a part or the whole of a frequency bandwidth, if information is simultaneously scheduled according to mMTC and URLLC, if information is simultaneously scheduled according to mMTC and eMBB, or if information is simultaneously scheduled according to eMBB, URLLC, and mMTC.

Hereinafter, exemplary embodiments of the disclosure will be described in detail with reference to the accompanying drawings. In describing the disclosure, a detailed description of related functions or configurations will be omitted if it is determined that it obscures the disclosure by unnecessary detail. Further, all terms used in the description are general terms that are widely used in consideration of their functions in the disclosure, but they may differ depending on the intentions of a person skilled in the art to which the disclosure belongs, customs, or appearance of new technology. Accordingly, they should be defined on the basis of the contents of the whole description of the disclosure.

Prior to the detailed explanation of the disclosure, examples of interpretable meanings of several terms used in the disclosure are presented. However, it is to be noted that the examples are not limited to the examples of interpretations presented below.

The base station is the subject that communicates with the terminal and performs resource allocation to the terminal, and it may be at least one of an evolved node B (eNode B or eNB), Node B (NB), base station (BS), base transceiver station (BTS), access point (AP), radio access unit, base station controller, or node on a network.

The terminal may include user equipment (UE), mobile station (MS), device, mobile equipment (ME), terminal, cellular phone, smart phone, computer, or a multimedia system capable of performing a communication function.

In the disclosure, a downlink (DL) is a radio transmission path of a signal that is transmitted from the base station to the terminal, and an uplink (UL) means a radio transmission path of a signal that is transmitted from the terminal to the base station. Hereinafter, although an embodiment of the disclosure is described in a state where an LTE or LTE-A system is exemplified, it is also possible to apply the embodiment of the disclosure to other communication systems having similar technical backgrounds or channel types. For example, the 5th generation mobile communication technology (5G, new radio, or NR) that is developed after LTE-A may be included therein. Further, the embodiment of the disclosure may also be applied to other communication systems through partial modifications thereof in a range that does not greatly deviate from the scope of the disclosure by the judgment of those skilled in the art.

In the LTE system that is a representative example of broadband wireless communication systems, the downlink (DL) adopts an orthogonal frequency division multiplexing (OFDM) scheme, and the uplink (UL) adopts a single carrier frequency division multiple access (SC-FDMA) scheme. The uplink means a radio link in which a terminal (or UE or MS) transmits data or a control signal to a base station (BS) (or eNode B), and the downlink means a radio link in which the base station transmits data or a control signal to the terminal. According to the above-described multiple access schemes, data of each user (terminal) or control information can be discriminated from that of other users (terminals) by performing an allocation and an operation so as to prevent time-frequency resources for carrying the data or control information for a user from overlapping those of other users, that is, to establish orthogonality.

The LTE system adopts a hybrid automatic repeat request (HARQ) scheme in which a physical layer retransmits the corresponding data if decoding failure occurs during initial data transmission. According to the HARQ scheme, a receiver may transmit information (negative acknowledgement (NACK)) for notifying a transmitter of the decoding failure if the receiver is unable to accurately decode the data, and the transmitter may make the physical layer retransmit the corresponding data. The receiver may combine the data that is retransmitted from the transmitter with the previous data of which the decoding has failed to heighten the data reception performance. Further, if the receiver has accurately decoded the data, the receiver may transmit information (acknowledgement (ACK)) for notifying the transmitter of decoding success, and the transmitter can transmit new data.

FIG. 1 is a diagram illustrating a downlink time frequency domain transmission structure of an LTE or LTE-A system.

FIG. 1 illustrates the basic structure of a time-frequency domain that is a radio resource region in which data or a control channel is transmitted on a downlink in an LTE system or a system similar to the LTE system. In this case, the horizontal axis represents the time domain, and the vertical axis represents the frequency domain. In the time domain, the minimum transmission unit is an OFDM symbol, and $N_{symb}$ OFDM symbols 102 constitute one slot 106, and two slots constitute one subframe 105. The length of a slot may be 0.5 ms, and the length of a subframe may be 1.0 ms. Further, a radio frame 114 is a time domain region that is composed of 10 subframes. In the frequency domain, the minimum transmission unit is a subcarrier, and the transmission bandwidth of the whole system is composed of $N_{RB}^{DL}$ subcarriers 104 in total. However, such numerical values may be variably applied.

In the time-frequency domain, the basic unit of resources is a resource element (RE) 112, and the RE 112 may be expressed by an OFDM symbol index and a subcarrier index. A resource block (RB) (or physical resource block (PRB)) 108 may be defined by $N_{symb}$ successive OFDM symbols 102 in the time domain and $N_{RB}$ successive subcarriers 110 in the frequency domain. Accordingly, in one slot, one RB 108 may include $N_{symb} \times N_{RB}$ REs 112. In general, the minimum allocation unit of the frequency domain of data is the RB, and in the LTE system, $N_{symb}=7$, $N_{RB}=12$, and $N_{RB}^{DL}$ and $N_{RB}$ may be in proportion to the bandwidth of the system transmission band. The data rate is increased in proportion to the number of RBs that are scheduled to the terminal.

The LTE system may define and operate 6 transmission bandwidths. In the case of an FDD system that operates to discriminate a downlink and an uplink from each other by means of frequency, the downlink transmission bandwidth and the uplink transmission bandwidth may differ from each other. A channel bandwidth represents an RF bandwidth corresponding to the system transmission bandwidth. Table 1 below presents the corresponding relationship between the system transmission bandwidth defined by the LTE system and the channel bandwidth. For example, the LTE system having a 10 MHz channel bandwidth may have a transmission bandwidth that is composed of 50 RBs.

TABLE 1

| | Channel bandwidth BW_Channel [MHz] | | | | |
|---|---|---|---|---|---|
| | 1.4 | 3 | 5 | 10 | 15 | 20 |
| Transmission bandwidth configuration N_RB | 6 | 15 | 25 | 50 | 75 | 100 |

Downlink control information may be transmitted within initial N OFDM symbols in the subframe. In an embodiment, in general, N={1, 2, 3}. Accordingly, in accordance with the amount of control information to be transmitted to the current subframe, the N value may be variably applied to each subframe. The control information being transmitted may include a control channel transmission period indicator indicating how many OFDM symbols the control information is transmitted through, scheduling information on downlink data or uplink data, and information on HARQ ACK/NACK.

On the other hand, in the LTE system, the scheduling information on the downlink data or the uplink data is transferred from the base station to the terminal through downlink control information (DCI). The DCI may be defined in accordance with various formats, and there may be an indication about whether the DCI is scheduling information on the uplink data (UL grant) or scheduling information on the downlink data (DL grant) according to the respective formats, whether the DCI is a compact DCI having control information of a small size, whether spatial multiplexing using multiple antennas is applied, and whether the DCI is a DCI for power control. For example, DCI format 1, which is the scheduling control information on the downlink data (DL grant), may include at least one of the following types of control information.

Resource allocation type 0/1 flag: This indicates whether a resource allocation scheme is of type 0 or type 1. The type 0 allocates resources in the unit of resource block group (RBG) through application of a bitmap scheme. In the LTE system, the basic unit of scheduling is an RB that is expressed as a time and frequency domain resource, and the RBG is composed of a plurality of RBs and becomes the basic unit of scheduling in the type 0 scheme. The type 1 allocates a specific RB in the RBG.

Resource block assignment: This indicates an RB allocated for data transmission. An expressed resource is determined in accordance with the system bandwidth and the resource allocation scheme.

Modulation and coding scheme (MCS): This indicates a modulation scheme used for data transmission and the size of a transport block (TB) that is data to be transmitted.

HARQ process number: This indicates a process number of a HARQ.

New data indicator: This indicates whether a HARQ is initially transmitted or retransmitted.

Redundancy version: This indicates a redundancy version of a HARQ.

Transmission power control (TCP) command for a physical uplink control channel (PUCCH): This indicates a transmission power control command for a PUCCH that is an uplink control channel.

The DCI may pass through a channel coding and modulation process, and it may be transmitted on a physical downlink control channel (PUCCH) that is a downlink physical control channel (or control information, hereinafter PUCCH and control information are used interchangeably) or an enhanced PDCCH (EPDCCH) (or enhanced control information, hereinafter EPDCCH and enhanced control information are interchangeably used).

In general, the DCI is scrambled with a specific radio network temporary identifier (RNTI) (or terminal identifier), independently with respect to each terminal, a cyclic redundancy check (CRC) is added, the DCI is channel-coded, and then the DCI is configured and transmitted on each independent PDCCH. In the time domain, the PDCCH is mapped and transmitted during the control channel transmission period. The frequency domain mapping location of the PDCCH may be determined by an Identifier (ID) of each terminal, and it may be spread to the whole system transmission band to be transmitted.

The downlink data may be transmitted on a physical downlink shared channel (PDSCH) that is a physical channel for transmitting the downlink data. The PDSCH may be transmitted after the control channel transmission period; and scheduling information, such as a detailed mapping location in the frequency domain and the modulation scheme, is determined based on the DCI being transmitted through the PDCCH.

Through an MCS in the control information constituting the DCI, the base station notifies the terminal of the modulation scheme that is applied to the PDSCH to be transmitted and the transport block size (TBS) of the data to be transmitted. In an embodiment, the MCS may be composed of 5 bits or more or less. The TBS corresponds to the size before channel coding for error correction is applied to the data transport block (TB) intended to be transmitted by the base station.

The modulation scheme that is supported by the LTE system may be quadrature phase shift keying (QPSK), 16 quadrature amplitude modulation (16QAM), and 64QAM, and respective modulation orders Qm correspond to 2, 4, and 6. That is, in the case of QPSK modulation, 2 bits per symbol may be transmitted; and in the case of 16QAM, 4 bits per symbol may be transmitted. Further, in the case of 64QAM, 6 bits per symbol may be transmitted. Further, in accordance with the system modification, the modulation scheme of 256QAM or more may be used.

Figure 2:
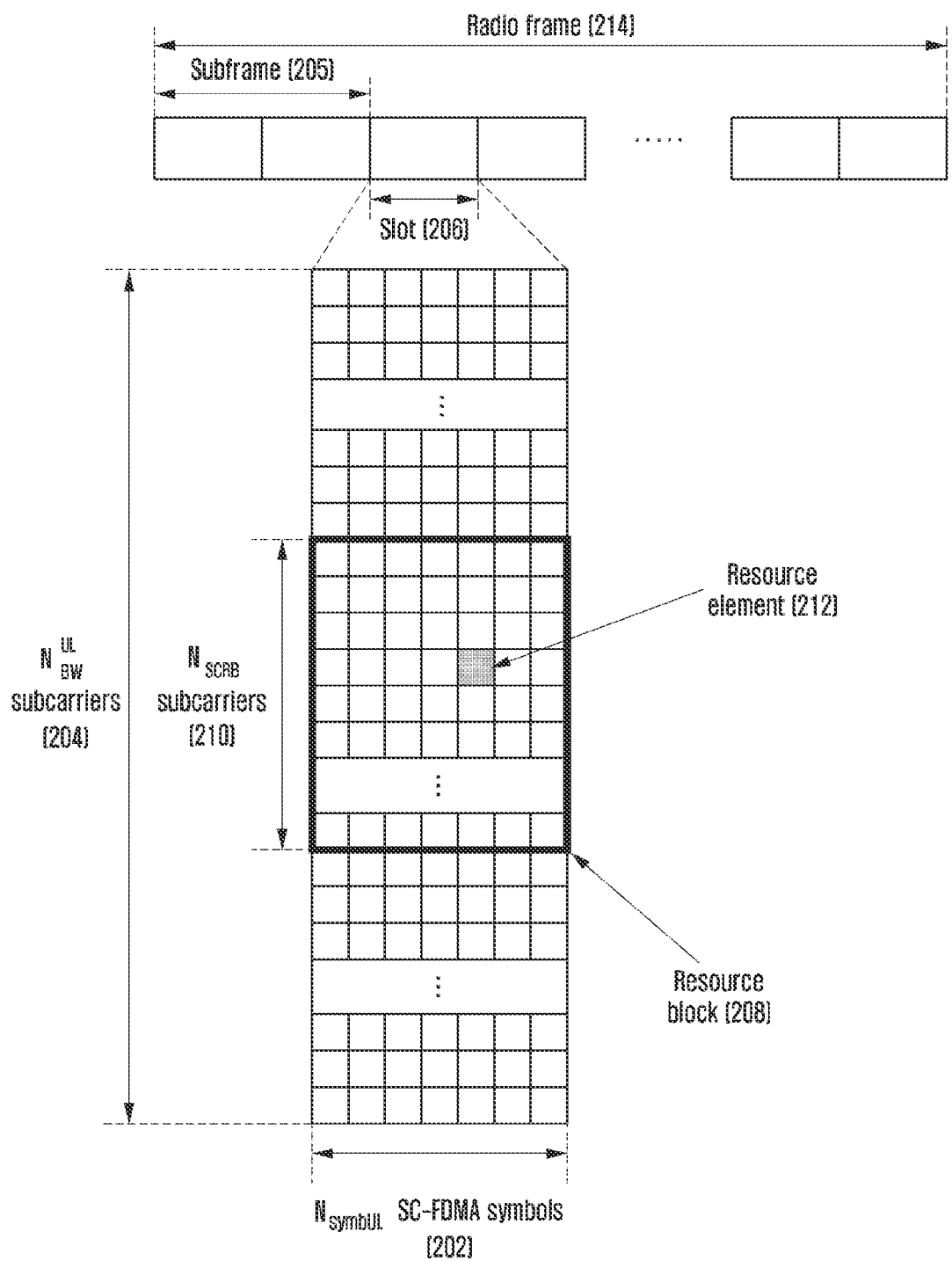
FIG. 2 is a diagram illustrating an uplink time-frequency domain transmission structure of an LTE or LTE-A system.

FIG. 2 is a diagram illustrating an uplink time-frequency domain transmission structure of an LTE or LTE-A system.

FIG. 2 illustrates the basic structure of a time-frequency domain that is a radio resource region in which data or a control channel is transmitted on an uplink in an LTE system or a system similar to the LTE system (e.g., LTE-A system). In this case, a horizontal axis represents the time domain, and a vertical axis represents the frequency domain. In the time domain, the minimum transmission unit is an SC-FDMA symbol 202, and $N_{symbUL}$ SC-FDMA symbols 202 may constitute one slot 206. Further, two slots 206 constitute one subframe 205. In the frequency domain, the minimum transmission unit is a subcarrier, and the transmission bandwidth 204 of the whole system is composed of $N_{RB}^{UL}$ subcarriers in total. In this case, $N_{RB}^{UL}$ may have a value that is in proportion to the system transmission bandwidth.

In the time frequency domain, the basic unit of resources is a resource element (RE) 212, and the RE 212 may be defined by an SC-FDMA symbol index and a subcarrier index. A resource block pair (RB pair) 208 may be defined by $N_{symbUL}$ successive SC-FDMA symbols in the time domain and $N_{scRB}$ successive subcarriers in the frequency domain. Accordingly, one RB may be composed of $N_{symbUL} \times N_{scRB}$ REs. In general, the minimum transmission unit of data or control information is an RB unit. The PUCCH is mapped to the frequency domain corresponding to 1 RB, and is transmitted for one subframe.

In the LTE system, the timing relationship may be defined between a PDSCH that is a physical channel for transmitting downlink data and a PUCCH or PUSCH that is an uplink physical channel on which HARQ ACK/NACK corresponding to PDCCH/EPDDCH including a semi-persistent scheduling release (SPS release) is transmitted. As an example, in the LTE system that operates as a frequency division duplex (FDD), the PDSCH that is transmitted in the (n−4)-th subframe or the HARQ ACK/NACK corresponding to the PDCCH/EPDCCH including the SPS release may be transmitted to the PUCCH or PUSCH in the n-th subframe.

On the other hand, the downlink HARQ in the LTE system adopts an asynchronous HARQ scheme in which a data retransmission time is not fixed. That is, if the base station receives a feedback of the HARQ NACK from the terminal with respect to initial transmission data transmitted by the base station, the base station freely determines the transmission time of the retransmission data by a scheduling operation. The terminal may perform buffering of data that is determined as an error as the result of decoding the received data for the HARQ operation, and then perform combining of the error data with next retransmission data.

If the PDSCH that includes the downlink data transmitted from the base station in subframe n is received, the terminal may transmit the uplink control information including HARQ ACK or NACK of the downlink data in subframe n+k to the base station through the PUCCH or PUSCH. In this case, "k" may be differently defined in accordance with the FDD or time division duplex (TDD) of the LTE system and the subframe configuration. As an example, in the case of an FDD LTE system, "k" is fixed to "4". On the other hand, in the case of a TDD LTE system, "k" may be changed in accordance with the subframe configuration and the subframe number. Further, during data transmission through a plurality of carriers, the k value may be differently applied in accordance with the TDD configuration of each carrier.

In the LTE system, unlike the downlink HARQ, the uplink HARQ adopts a synchronous HARQ scheme in which the data transmission time is fixed. That is, the uplink/downlink timing relationship among a physical uplink shared channel (PUSCH) that is a physical channel for transmitting uplink data, a PDCCH that is a preceding downlink control channel, and a physical hybrid indicator channel (PHICH) that is a physical channel on which a downlink HARQ ACK/NACK corresponding to the PUSCH is transmitted may be transmitted or received in accordance with the following rules.

If the terminal receives the PDCCH including uplink scheduling control information that is transmitted from the base station in subframe n or the PHICH on which the downlink HARQ ACK/NACK is transmitted, the terminal transmits uplink data corresponding to the control information on the PUSCH in subframe n+k. In this case, "k" may be differently defined in accordance with the FDD or time division duplex (TDD) of the LTE system and the configuration thereof. As an example, in the case of the FDD LTE system, "k" may be fixed to "4". On the other hand, in the case of the TDD LTE system, "k" may be changed in accordance with the subframe configuration and the subframe number. Further, during data transmission through a plurality of carriers, the k value may be differently applied in accordance with the TDD configuration of each carrier.

Further, if the terminal receives the PHICH including information related to the downlink HARQ ACK/NACK from the base station in subframe i, the PHICH corresponds to the PUSCH transmitted by the terminal in subframe i-k. In this case, "k" may be differently defined in accordance with the FDD or TDD of the LTE system and the configuration thereof. As an example, in the case of the FDD LTE system, "k" is fixed to "4". On the other hand, in the case of the TDD LTE system, "k" may be changed in accordance with the subframe configuration and the subframe number. Further, during data transmission through a plurality of carriers, the k value may be differently applied in accordance with the TDD configuration of each carrier.

TABLE 2

| Transmission mode | DCI format | Search Space | Transmission scheme of PDSCH corresponding to PDCCH |
| --- | --- | --- | --- |
| Mode 1 | DCI format 1A | Common and UE specific by C-RNTI | Single-antenna port, port 0 (see subclause 7.1.1) |
|  | DCI format 1 | UE specific by C-RNTI | Single-antenna port, port 0 (see subclause 7.1.1) |

TABLE 2-continued

| Transmission mode | DCI format | Search Space | Transmission scheme of PDSCH corresponding to PDCCH |
|---|---|---|---|
| Mode 2 | DCI format 1A | Common and UE specific by C-RNTI | Transmit diversity (see subclause 7.1.2) |
|  | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
|  | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
|  | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subclause 7.1.2) |
|  | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
|  | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 2B | UE specific by C-RNTI | Dual layer transmission, port 7 and 8 (see subclause 7.1.5A) or Single-antenna port, port 7 or 8 (see subclause 7.1.1) |

Table 2 is related to PDCCH and PDSCH configured by C-RNTI, and it shows supportable DCI format types according to respective transmission modes on conditions configured by C-RNTI presented in 3GPP TS 36.213. The terminal performs a search and decoding on the assumption that the corresponding DCI format exists at a control region interval in accordance with a predetermined transmission mode. For example, if transmission mode 8 is indicated, the terminal searches for DCI format 1A in a common search space and a UE-specific search space, and it searches for DCI format 2B only in the UE-specific search space.

As described above, the wireless communication system has been described based on the LTE system, but the contents of the disclosure are not limited to the LTE system and may be applied to various wireless communication systems, such as NR and 5G. Further, in an embodiment, in the case of applying the disclosure to a different wireless communication system, the k value may be changed and applied even to a system using a modulation scheme corresponding to the FDD.

Figure 3:
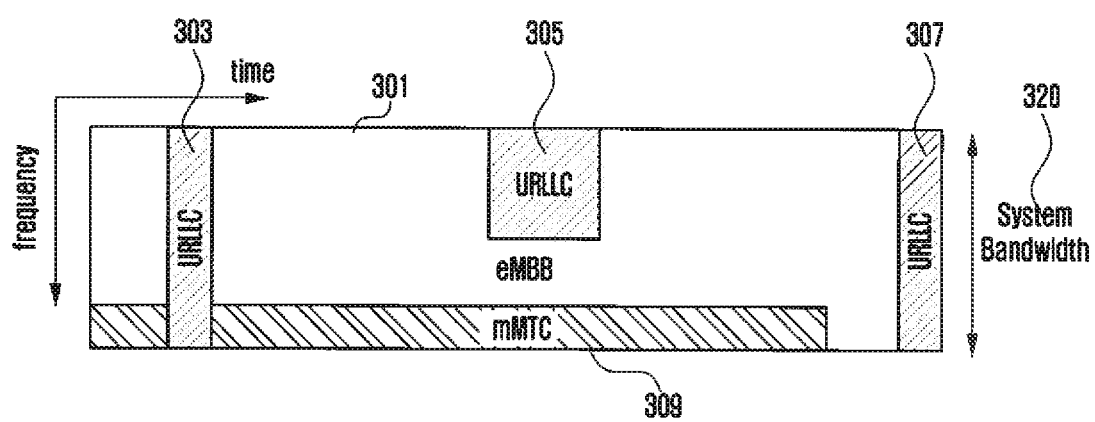
FIG. 3 is a diagram illustrating an example of data for eMBB, URLLC, and mMTC being allocated in frequency-time resources in a communication system.
Figure 4:
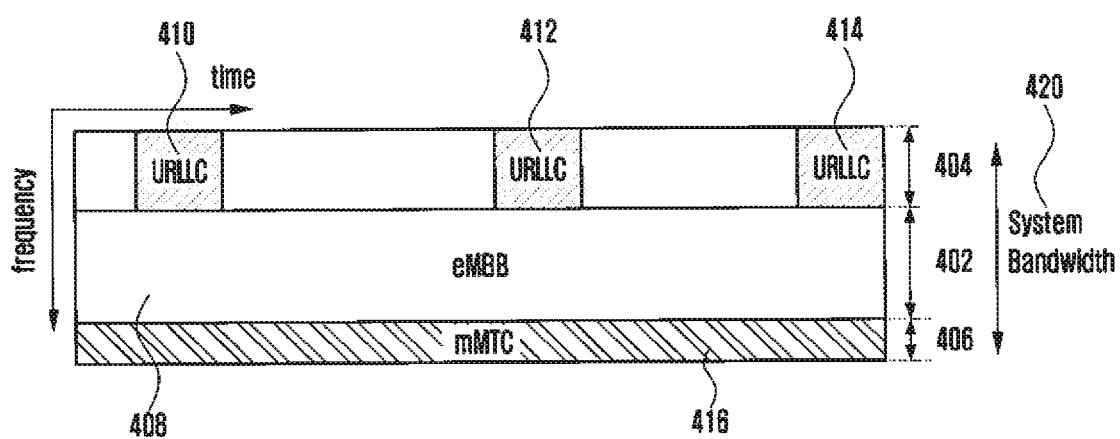
FIG. 4 is a diagram illustrating another example of data for eMBB, URLLC, and mMTC being allocated in frequency-time resources in a communication system.

FIG. 3 is a diagram illustrating an example of data for eMBB, URLLC, and mMTC being allocated in frequency-time resources in a communication system, and FIG. 4 is a diagram illustrating another example of data for eMBB, URLLC, and mMTC being allocated in frequency-time resources in a communication system.

FIGS. 3 and 4 illustrate a state where data for eMBB, URLLC, and mMTC, which are services being considered in a 5G or NR system, are allocated in frequency-time resources. In this case, it can be seen that frequency and time resources are allocated for information transmission in each system.

First, FIG. 3 illustrates that data for eMBB, URLLC, and mMTC are allocated in the whole system frequency bandwidth 320. It may be necessary to generate and transmit URLLC data 303, 305, and 307 while eMBB 301 and mMTC 309 are allocated and transmitted in a specific frequency bandwidth. In this case, it may be possible to transmit the URLLC data 303, 305, and 307 without emptying a part to which the eMBB 301 and the mMTC 309 have already been allocated or without transmitting the eMBB 301 and the mMTC 309.

Because it is necessary to reduce a delay time of the URLLC 303, 305, and 307 among the services, the URLLC data 303, 305, and 307 may be allocated to a part of the resource to which eMBB 301 is allocated, and then may be transmitted. In this case, if the URLLC 303, 305, and 307 is additionally allocated to the resource to which the eMBB 301 has been allocated and is transmitted, the data of the eMBB 301 may not be transmitted in the frequency-time resource in which the resource to which the eMBB 301 is allocated and the resource to which the URLLC 303, 305, and 307 is allocated overlap each other. Accordingly, the transmission performance of the data of the eMBB 301 may be lowered. That is, in the above-described case, transmission failure of the data of the eMBB 301 because of the allocation of the URLLC 303, 305, and 307 may occur. Similarly, even in the case of the data of the eMTC 309, the data of the eMTC 309 may not be transmitted in the frequency-time resource in which the resource to which the eMTC 309 is allocated and the resource to which the URLLC 303 is allocated overlap each other. Accordingly, transmission failure of the data of the eMTC 309 may occur because of the allocation of the URLLC 303.

With reference to FIG. 4, the whole system frequency bandwidth 420 may be divided into a plurality of subbands 402, 404, and 406. Further, the respective divided subbands 402, 404, and 406 may be used for the purpose of transmitting separate services and data. Information related to the configuration of the subbands 402, 404, and 406 may be predetermined, and this information may be transmitted from the base station to the terminal through higher layer signaling. Further, the information related to the subbands 402, 404, and 406 may be optionally divided by the base station or network node, and services may be provided to the terminal without transmission of separate configuration information of the subbands 402, 404, and 406. FIG. 4 exemplarily illustrates that the whole system frequency band 420 is divided into three subbands 402, 404, and 406, but the number of divided subbands is not limited thereto. Of course, the whole system frequency bandwidth 420 may be divided into less than three or more than three subbands. In this case, the first subband 402, the second subband 404, and the third subband 406 may be used to transmit eMBB data 408, URLLC data 410, 412, and 414, and mMTC data 416, respectively.

On the other hand, in the whole embodiment of the disclosure, the length of a transmission time interval (TTI) used to transmit the URLLC may be shorter than the length of the TTI used to transmit the eMBB or mMTC. Further, a response to the information related to the URLLC may be transmitted faster than that of the eMBB or mMTC; thus, the information can be transmitted and received with low latency.

Hereinafter, an eMBB service is called a first type service, and eMBB data is called first type data. Neither the first type service nor the first type data is limited to the eMBB, and they may correspond to even a case where high-speed data transmission is required or broadband transmission of a service is performed. Further, a URLLC service is called a second type service, and URLLC data is called second type data. Neither the second type service nor the second type data is limited to the URLLC, and they may correspond to a service that requires low latency or high-reliability transmission, or they may correspond to another system that requires both low latency and high reliability. Further, an mMTC service is called a third type service, and mMTC data is called third type data. Neither the third type service nor the third type data is limited to the mMTC, and they may correspond to a service that requires low speed, wide coverage, or low power. Further, according to embodiments, the first type service may or may not include the third type service.

Further, in order to transmit the three kinds of services (eMBB, URLLC, and mMTC) or data as described above, different physical layer channel structures may be used for respective types of data and services. For example, at least one of transmission time interval (TTI) lengths, frequency resource allocation units, control channel structures, and data mapping methods may differ from each other.

Meanwhile, three kinds of services (eMBB, URLLC, and mMTC) and three kinds of data have been described, but the services and data are not limited thereto. More kinds of services and the corresponding data may exist; and, even in such a case, the contents of the disclosure can also be applied.

The terms "physical channel" and "signal" in the LTE or LTE-A system in the related art may be used to explain a method and an apparatus proposed in an embodiment. However, the contents of the disclosure may also be applied to a wireless communication system that is not the LTE or LTE-A system.

As described above, an embodiment proposes a detailed method for defining transmission and reception operations of the terminal and the base station for transmission of the first, second, and third type services or data, and operating the terminals, in which different types of services or data are scheduled, together in the same system. In the disclosure, the first, second, and third type terminals indicate terminals in which the first, second, and third type services or data are scheduled. Further, in an embodiment, the first, second, and third type terminals may be the same terminal or different terminals.

Hereinafter, in an embodiment, at least one of an uplink scheduling grant signal and a downlink data signal is called a first signal. Further, in the disclosure, at least one of an uplink data signal for the uplink scheduling grant and an HARQ ACK/NACK for the downlink data signal is called a second signal. In an embodiment, among signals that the base station transmits to the terminal, a signal that expects a response from the terminal may be the first signal, and a response signal of the terminal that corresponds to the first signal may be the second signal. Further, in an embodiment, the service type of the first signal may be at least one of eMBB, URLLC, and mMTC, and the second signal may also correspond to at least one of the above-described services.

Hereinafter, in an embodiment, the TTI length of the first signal is a time value related to transmission of the first signal, and it may indicate the length of time in which the first signal is transmitted. Further, in the disclosure, the TTI length of the second signal is a time value related to transmission of the second signal, and it may indicate the length of time in which the second signal is transmitted. The TTI length of the third signal is a time value related to transmission of the third signal, and it may indicate the length of time in which the third signal is transmitted. Further, in the disclosure, the second signal transmission timing may be information on when the terminal transmits the second signal and when the base station receives the second signal, and it may be called the second signal transmission/reception timing.

The contents of the disclosure are applicable to the FDD and TDD systems.

Hereinafter in the disclosure, higher layer signaling may be a signal transfer method in which the base station transfers a signal to the terminal using a downlink data channel of a physical layer or the terminal transfers a signal to the base station using an uplink data channel of the physical layer, and it may be described as RRC signaling, PDCP signaling, or a MAC control element (MAC CE).

Figure 5:
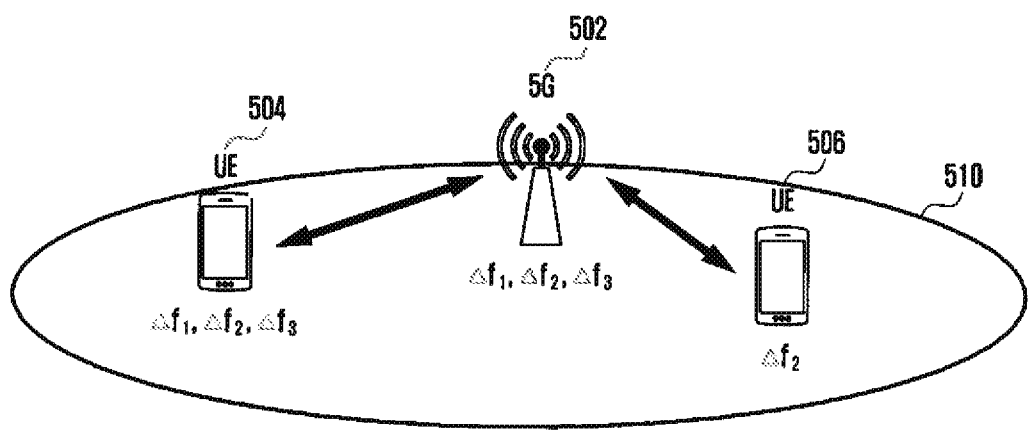
FIG. 5 is a diagram illustrating an environment in which a plurality of numerologies are supported in one cell according to an embodiment of the disclosure.

FIG. 5 is a diagram illustrating an environment in which a plurality of numerologies are supported in one cell according to an embodiment of the disclosure.

With reference to FIG. 5, one base station 502 or one cell 510 can support a plurality of numerologies, such as subcarrier spacings. That is, it may be possible to support different subcarrier spacings by frequency bandwidth in the whole system frequency bandwidth supported by the base station 502. For example, the base station 502 may support 15 kHz subcarrier spacing in one frequency bandwidth, and it may support 30 kHz subcarrier spacing in another frequency bandwidth. Information on the frequency bandwidths supporting different subcarrier spacings is system information, and the information may be values that terminals 504 and 506 can be aware of before the terminals are attached in advance to the base station 502. Further, one reference subcarrier spacing may be determined, and then the terminals 504 and 506 may identify the subsequent subcarrier spacing values later through RRC signaling and so on. Further, according to embodiments, the frequency bandwidth in which the subcarrier spacing is configured may be changeable in accordance with time. Further, the numerology is a set of values applied in the mobile communication; and, for example, it may include frequency, time, subcarrier spacing, and so on.

On the other hand, the terminals 504 and 506 may include the terminal 504 supporting all subcarrier spacings supported by the base station 502, or the terminal 506 supporting only parts of the subcarrier spacings. The terminal 504 supporting all the subcarrier spacings supported by the base station 502 can operate in all the system frequency bandwidths Δf1, Δf2, and Δf3 provided by the base station 502. In contrast, the terminal 506 supporting only parts of the subcarrier spacings supported by the base station 502 can operate only in the frequency bandwidth Δf2 in which the subcarrier spacing that can be supported by the terminal 506 is configured.

Further, the terminals 504 and 506 can also support frequency bandwidths that are smaller than the system frequency bandwidths Δf1, Δf2, and Δf3 supported by the base station 502. In such a situation, the terminals 504 and 506 can operate in the frequency bandwidths satisfying two conditions as follows. One is a frequency bandwidth supported by the terminals 504 and 506 themselves, and the other is a frequency bandwidth in which the subcarrier spacing that can be supported by the terminals 504 and 506 themselves is supported. The base station 502 performs uplink or downlink scheduling and resource allocation in consideration of the frequency bandwidths in which the terminals 504 and 506 can operate in accordance with the frequency bandwidths Δf1, Δf2, and Δf3 that the base station 502 itself configures according to the subcarrier spacing.

Further, in addition to the above-described subcarrier spacings, other numerology values can be applied in the same or a similar manner. For example, the numerology values may be TTI, mini-slot, subframe, and frame, which may be transmission units on the time axis.

As an example of where the subcarrier spacing supports another environment, the frequency bandwidth supporting 15 kHz subcarrier spacing may be used as the bandwidth for eMBB service, and the frequency bandwidth supporting 30 and 60 kHz subcarrier spacings, which are values exceeding 15 kHz, may be used as the bandwidths for eMBB or URLLC service. From this point of view, operable frequency bandwidths may differ in accordance with the terminal type supporting only eMBB service, the terminal type supporting only URLLC service, or the terminal type supporting both the two services.

Figure 6:
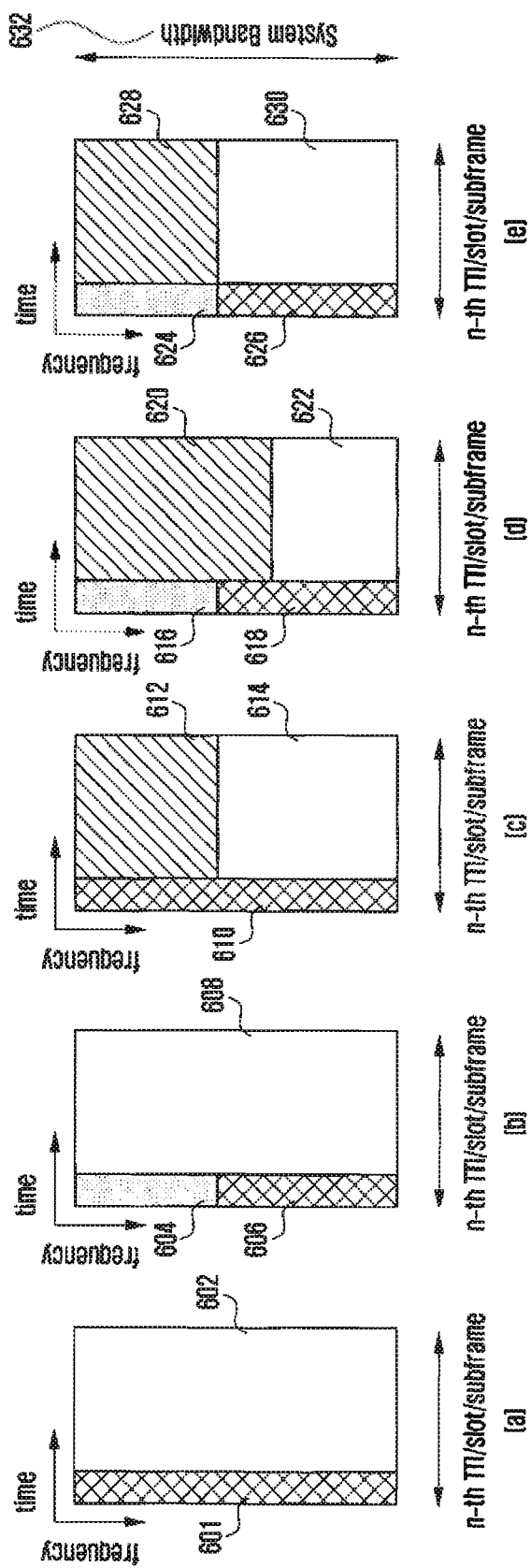
FIG. 6 is a diagram illustrating the structures of a control region and a data region that do not overlap each other from the viewpoint of time in one cell supporting a plurality of numerologies according to an embodiment of the disclosure.

FIG. 6 is a diagram illustrating the structures of a control region and a data region that do not overlap each other from the viewpoint of time in one cell supporting a plurality of numerologies according to an embodiment of the disclosure.

With reference to (a) of FIG. 6, a control region 601 having a single numerology value and a data region 602 are illustrated. These regions 601 and 602 may have different numerologies or the same numerology. Further, the control region and the data region may be transmitted in the unit of one TTI, slot, subframe, or mini-slot. In this case, the control region and the data region may be dividedly transmitted from the viewpoint of time. That is, a time division multiplexing (TDM) situation may be considered.

With reference to (b) of FIG. 6, a case is illustrated in which a control region includes a plurality of control regions having different frequency bandwidths, for example, two control regions including a first control region 604 and a second control region 606. In this case, the first control region 604 can configure the numerology as a value, and the second control region 606 can configure the numerology as b value that is different from the a value. Further, with reference to (b) of FIG. 6, a data region 608 may have one numerology in the whole frequency bandwidth 632. The data region 608 may have the same numerology as that of the first control region 604 or the second control region 606, or it may have a numerology different from that of the two control regions 604 and 606.

With reference to (c) of FIG. 6, a case is illustrated in which a data region includes a plurality of data regions having different frequency bandwidths, for example, two data regions including a first data region 612 and a second data region 614. In this case, the numerology of the first data region 612 may be configured as a, and the numerology of the second data region 614 may be configured as b that is different from a. Further, with reference to (c) of FIG. 6, the control region 610 may have one numerology in the whole frequency bandwidth 632 supported by the base station. In this case, the control region 610 may have the same numerology value as that of the first data region 612 or the second data region 614, or it may have a numerology value different from that of the two data regions 612 and 614.

With reference to (d) of FIG. 6, a control region may include a plurality of control regions 616 and 618 in which different numerologies are used, and a data region may also include a plurality of data regions 620 and 622 in which different numerologies are used. In this case, different numerologies may be used in the first control region 616 and the second control region 618. For example, the numerology value of the first control region 616 may be a, and the numerology value of the second control region 618 may be b. Further, different numerologies may be used in the first data region 620 and the second data region 622. For example, the numerology value of the first data region 620 may be c, and the numerology value of the second data region 622 may be d. In this case, according to embodiments, the numerologies used in the control regions 616 and 618 may be equal to or may be different from the numerologies used in the data regions 620 and 622. Further, according to embodiments, the numerologies used in the data regions 620 and 622 may be equal to or may be different from the numerologies used in the control regions 616 and 618. For example, the numerologies a, b, c, and d may have different values. Further, according to embodiments, a may be equal to c, and b may be equal to d; or a may be equal to d, and b may be equal to c. Further, with reference to (d) of FIG. 6, the frequency bandwidths in which the different numerologies are used in the control regions 616 and 618 are different from the frequency bandwidths in which different numerologies are used in the data regions 620 and 622. For example, the control region may include the first control region 616 and the second control region 618 in which the different numerologies are used, and the data region may include the first data region 620 and the second data region 622 in which the different numerologies are used. In this case, the frequency bandwidths of the first and second control regions 616 and 618 may be different from the frequency bandwidths of the first and second data regions 620 and 622. That is, the frequency bandwidth of the first control region 616 may be different from the frequency bandwidth of the first data region 620, and the frequency bandwidth of the second control region 618 may be different from the frequency bandwidth of the second data region 622.

With reference to (e) of FIG. 6, although the configuration is mostly similar to that as described above with reference to (d) of FIG. 6, frequency bandwidths used by different numerologies in control regions 624 and 626 are equal to frequency bandwidths used by different numerologies in data regions 628 and 630. For example, the control region may include the first control region 624 and the second control region 626 in which different numerologies are used, and the data region may include the first data region 628 and the second data region 630 in which different numerologies are used. In this case, the frequency bandwidth of the first control region 624 may be equal to the frequency bandwidth of the first data region 628, and the frequency bandwidth of the second control region 626 may be equal to the frequency bandwidth of the second data region 630.

On the other hand, the frequency bandwidths used by the control regions and the data regions having different numerologies as described above with reference to (a) to (e) of FIG. 6 may be initially configured in the same manner as the system information transmission, may be semi-statically changed through RRC signaling, or may be dynamically changed through L1 signaling. Further, the frequency bandwidths used by the control regions and the data regions having the different numerologies may be changed in accordance with traffic capacity supported by respective service levels and the number of attaches of the terminals supporting a specific service. For example, if the number of terminals supporting the first numerology is larger than the number of terminals supporting the second numerology, or the terminals supporting the first numerology require large traffic capacity at an initial stage, many frequency bandwidths for the first numerology may be allocated. However, if the number of terminals supporting the second numerology is larger than the number of terminals supporting the first numerology, or the terminals supporting the second numerology require large traffic capacity with the lapse of time, the frequency bandwidths allocated to the first numerology may be reduced, and the frequency bandwidths allocated to the second numerology may be increased.

The above-described numerologies are valid even if they are conceptually changed and applied to subcarrier spacing or resource block unit. Further, although FIG. 6 exemplarily illustrates maximally two different numerologies of the control region and the data region, a larger number of numerology values may be applied to the control region and the data region. Further, it is to be noted that operations which relate to the terms first control region, second control region, first data region, and second data region are not operations that are associated with one another. That is, scheduling indicated in the first control region is not generated only in the first data region, and it may be generated even in the second data region. In a similar manner, scheduling indicated in the second control region is not generated only in the second data region, and it may be generated even in the first data region. The above-described matters can be equally applied even in a situation where a different concept is described.

Figure 7:
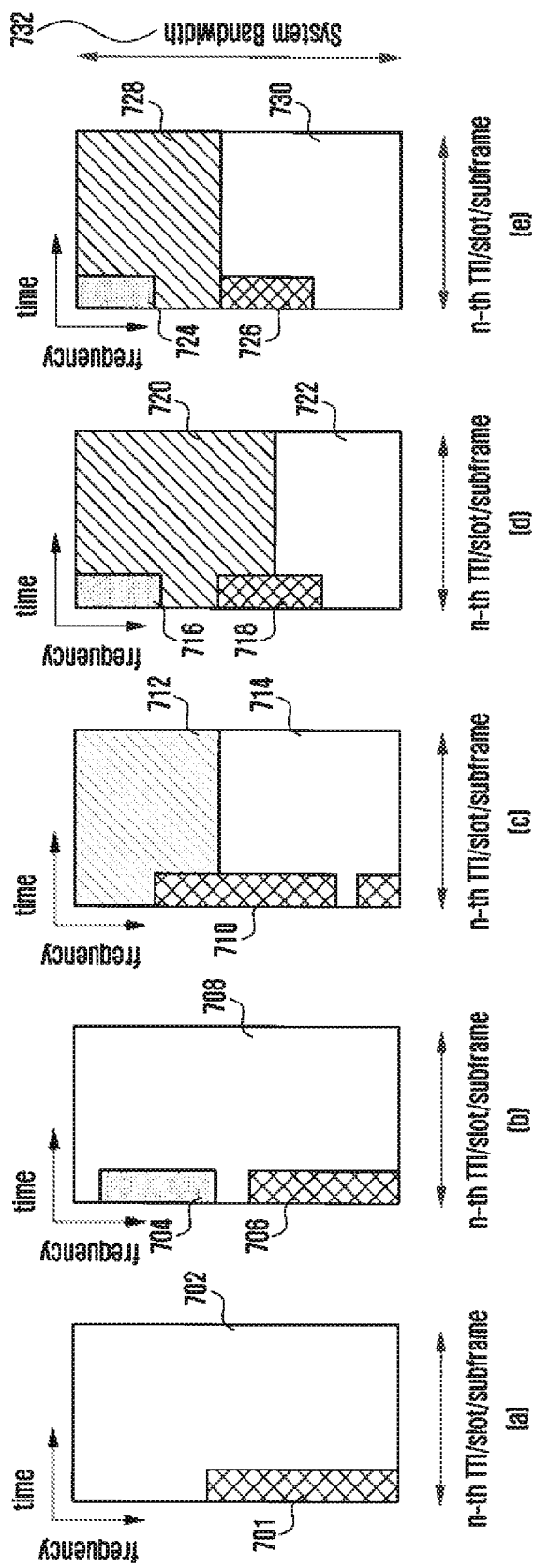
FIG. 7 is a diagram illustrating the structures of a control region and a data region that can overlap each other from the viewpoint of time in one cell supporting a plurality of numerologies according to an embodiment of the disclosure.

FIG. 7 is a diagram illustrating the structures of a control region and a data region that can overlap each other from the viewpoint of time in one cell supporting a plurality of numerologies according to an embodiment of the disclosure.

With reference to (a) of FIG. 7, a control region 701 having a single numerology value and a data region 702 are illustrated. According to embodiments, the control region 701 and the data region 702 may have different numerology values or the same numerology value. Further, only a part of the control region 701 may be used in the whole system frequency bandwidth 732. Further, the remaining frequency bandwidth part of the whole system frequency bandwidth 732, which is not used by the corresponding control region 701, may be used as the data region 702.

With reference to (b) of FIG. 7, a case is illustrated in which a control region includes a plurality of control regions having different frequency bandwidths, for example, two control regions including a first control region 704 and a second control region 706. Further, it is illustrated that the data region 702 has one numerology in the whole frequency bandwidth 732. In this case, the first control region 704 and the second control region 706 may have different numerologies. For example, the first control region 704 can configure the numerology as a value, and the second control region 706 can configure the numerology as b value that is different from the a value. Further, a data region 708 has one numerology. In this case, the data region 708 may have the same numerology as that of the first control region 704 or the second control region 706, or it may have the numerology different from that of the two control regions 704 and 706. Further, both the two control regions 704 and 706 can use only a partial frequency bandwidth of the whole system frequency bandwidth 732. Further, the data region 708 can use the remaining frequency bandwidth of the whole system frequency bandwidth 732 that is not used by the control regions 704 and 706. Here, if the sum of the frequency bandwidths used by the two control regions 704 and 706 does not exceed the system frequency bandwidth 732, it may be considered that the two control regions 704 and 706 use the partial frequency bandwidth of the system frequency bandwidth 732.

With reference to (c) of FIG. 7, a control region 710 uses one numerology, and a data region includes a plurality of data regions using different numerologies, for example, two data regions including a first data region 712 and a second data region 714. In this case, the first data region 712 and the second data region 714 may use different numerologies. For example, the numerology of the first data region 712 may be configured as a, and the numerology of the second data region 714 may be configured as b that is different from a. Further, the control region 710 may use one numerology in the whole frequency bandwidth 732 supported by the base station. Further, the control region 710 may use the same numerology as that of the first data region 712 or the second data region 714, or it may use the numerology that is different from that used by the two data regions 712 and 714. On the other hand, the control region 710 may not use all the system frequency bandwidth 732, and it may use only a part thereof. Further, the control region 710 may not necessarily use one continuous frequency bandwidth, and it may use a plurality of discontinuous frequency bandwidths as illustrated. Here, if the sum of the frequency bandwidths used by the control region 710 does not exceed the system frequency bandwidth 732, it may be considered that the control region 710 uses the partial frequency bandwidth of the system frequency bandwidth 732. Further, the frequency band that is not used by the control region 710 among the whole system frequency band 732 may be used for the first data region 712, the second data region 714, or both the two data regions 712 and 714. With reference to (c) of FIG. 7, it is exemplified that both the first data region 712 and the second data region 714 are allocated to the frequency band that is not used by the control region 710.

With reference to (d) of FIG. 7, a control region may include a plurality of control regions 716 and 718 in which different numerologies are used, and a data region may also include a plurality of data regions 720 and 722 in which different numerologies are used. In this case, different numerologies may be used in the first control region 716 and the second control region 718. For example, the numerology value of the first control region 716 may be a, and the numerology value of the second control region 718 may be b. Further, different numerologies may be used in the first data region 720 and the second data region 722. For example, the numerology value of the first data region 720 may be c, and the numerology value of the second data region 722 may be d. In this case, the numerologies used in a certain control region 716 or 718 may be equal to one of the numerologies used in the two data regions 716 and 718, or different numerologies may be used therein. For example, the control region may include the first control region 716 and the second control region 718 in which the different numerologies are used, and the data region may include the first data region 720 and the second data region 722 in which the different numerologies are used. In this case, the frequency bandwidth of the first control region 716 may be different from the frequency bandwidth of the first data region 720, and the frequency bandwidth of the second control region 718 may be different from the frequency bandwidth of the second data region 722. On the other hand, both the two control regions 716 and 718 can exist only in a partial frequency bandwidth of the whole system frequency bandwidth 732. Here, if the sum of the frequency bandwidths of the two control regions 716 and 718 does not exceed the whole system frequency bandwidth 732, it may be considered that the two control regions 716 and 718 use the partial frequency bandwidth of the system frequency band 732. Further, with reference to (d) of FIG. 7, it is possible that the frequency bandwidth used by one control region 718 exists over the frequency bandwidth used by the respective data regions 720 and 722. For example, the second control region 718 may share partially the same frequency band with the first data region 720 and the second data region 722. Further, the frequency bandwidth that is not used by the first control region 716 and the second control region 718 among the whole system frequency band 732 may be used for the first data region 720, the second data region 722, or both the two data regions 720 and 722.

With reference to (e) of FIG. 7, the configuration is mostly similar to that as described above with reference to (d) of FIG. 7, but it is different from that on the point that the frequency bandwidth used by a certain control region 724 or 726 should belong to only the frequency bandwidth used by one data region 728 or 730. For example, the frequency bandwidth used by the first control region 724 may be a part of the frequency bandwidth used by the first data region 728. Further, the second control region 726 may use a part of the frequency bandwidth used by the second data region 730. The frequency bandwidth used by a certain control region 724 or 726 is unable to be put over the frequency bandwidth used by the different data regions 728 and 730.

Figure 8:
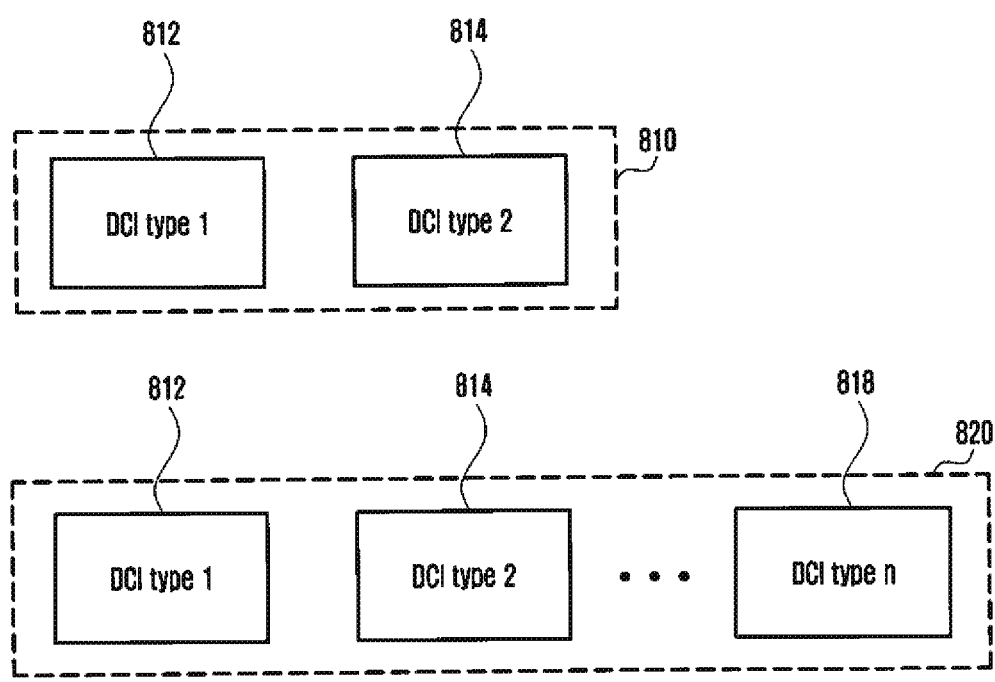
FIG. 8 is a diagram illustrating an example of a control information structure according to an embodiment of the disclosure.

FIG. 8 is a diagram illustrating an example of a control information structure according to an embodiment of the disclosure.

With reference to FIG. 8, various types of control information can be configured. For example, control information (e.g., downlink control information (DCI) type 1 812 and control information type 2 814) may be transferred from a base station to a terminal. Further, the terminal may assume respective control information types 812 and 814 and perform decoding in order to determine what information of the control information types is transferred to the terminal itself. It may be exemplified that control information type 1 812 and control information type 2 814 have the same number of bits, but they have different kinds of bits indicating information in the corresponding bits in a situation where there exists a group 810 of the control information types that the terminal can determine or interpret. That is, the terminal determines how many bits are provided to determine the corresponding control information types, and if the corresponding control information types 812 and 814 have the same number of bits, the terminal preferentially performs decoding based on common bit number information and determines whether the corresponding decoded information is for the control information type 1 812 or the control information type 2 814 through a flag bit in the decoded information. For example, if the corresponding flag bit indicates 0 in a situation where the foremost bit of the control information is the flag bit, it can be interpreted that the corresponding control information means the type 1 812; whereas, if the corresponding flag bit indicates 1, it can be interpreted that the corresponding control information means the type 2 814.

Further, as an element constituting the control information, a new data indicator (NDI) may be included, and this NDI information is used for the purpose of providing notification on whether the corresponding data is new data for initial transmission or the existing transmitted data for the purpose of retransmission. In this case, the corresponding control information configuration may be changed through the NDI information. In other words, the control information type for the purpose of retransmission and the control information type for the purpose of initial transmission may include different pieces of information. For example, if it is possible to retransmit only code blocks (CBs) during the retransmission in a situation where only the corresponding CBs have errors among initially transmitted transport blocks (TBs), the control information configuration for retransmitting only the corresponding CBs may become different from the control information configuration for transmitting the TBs during the initial transmission.

The above-described situation considers a case of two control information types in total (810), but it can also be applied to a case of n control information types. In this case, if the n control information types 812, 814, and 818 have the same number of bits, the number of flag bits for discriminating the n control information types is proportionally increased. For example, if the terminal has a possibility to receive the corresponding control information types 812, 814, and 818 in a situation where the four control information types have the same number of bits in all, two flag bits in total are necessary to discriminate the corresponding control information types.

The above-described method can be applied even in a situation where a downlink URLLC service and an eMBB service coexist. Because the URLLC service is intermittently generated, but requires a very low latency, a part of a resource region for already scheduled eMBB service can be used for the URLLC service. If such a situation occurs, an eMBB terminal using the corresponding eMBB service does not know the corresponding fact and thus will report NACK to the base station. In this case, the base station may separately include URLLC related information through retransmission providing notification of the breakdown of a part of eMBB data to be received by the corresponding eMBB terminal because of URLLC in the control information. For example, the URLLC related information may be a URLLC indicator. According to embodiments, the base station may include the URLLC indicator in the control information to be transmitted at a certain determined time without NACK report of the terminal. In this situation, the control information configuration may differ. This is because it is not necessary to use the bit indicating the URLLC indicator during the initial transmission. Accordingly, it is necessary to include the information providing notification of the URLLC indicator in the retransmission related control information, and the terminal can indirectly determine this through the NDI information. That is, if the terminal determines that the corresponding control information is for the initial transmission through the NDI, the terminal may determine that there is not the URLLC indicator information. Further, if the terminal determines that the corresponding control information is for retransmission through the NDI, the terminal may determine that there is the URLLC indicator information.

The URLLC indicator information is information for providing notification on whether the previously generated eMBB data is affected by the URLLC, and it may be in the form for notifying the frequency and time or time information. The frequency unit may be a physical resource group (PRB) or a PRB group, and the time may be in the unit of slot, subframe, slot group, mini-slot, mini-slot group, or symbol. In addition, the unit of the code block or the code block group may be included in the URLLC indicator information.

All or some elements constituting the control information, such as the URLLC indicator information, HARQ process field, MCS field, RV field, resource block (RB) field, physical resource field (PRB), data information region start location symbol index field, or data region end location index field, may be or may not be included in the control information in accordance with the numerology or additional specific configuration (e.g., minimum supportable mini-slot length, terminal-supportable maximum soft buffer, terminal-supportable frequency band, or terminal-supportable minimum timing advance (TA) value). The above-described numerology may be numerology of the control region searched by the terminal, default numerology transferred to the base station by RRC, SIB, or MAC CE, or numerology in which data is received in a data information region.

In order to add the corresponding URLLC indicator information to the control information used for the initial transmission without adding any separate bit to the control information used for the initial transmission, parts of bit information for data resource allocation, bit information for HARQ process indication, and bit information for MCS selection may be explicitly or implicitly used for the URLLC indicator information. In order to explicitly use partial bits of the control information for the URLLC indicator information, for example, if the number of resource allocation bits used for the initial transmission is 5, the control information for retransmission can be generated using two bits of the resource allocation bits for the URLLC indicator information and using the three remaining bits thereof as resource allocation bits used during the retransmission. Further, in order to implicitly use partial bits of the control information for the URLLC indicator information, for example, parts of 32 kinds of information that can be transferred with 5 bits used for the resource allocation during the initial transmission can be used for the URLLC indicator in the retransmission control information. That is, three-information configuration of 32-information configuration may be interpreted as the URLLC indicator information rather than the purpose of resource allocation. In such a method, not only the bit information used for the resource allocation but also information of one or several bits among the information used for the initial transmission can be simultaneously used. The above-described control information can be transferred to the terminals through a common search space (CSS), UE-specific search space (USS), or UE group-specific search space (UGSS). Further, it is possible to support detection of the specific control information only in the specific search space, or it is possible to support detection of the specific control information only in the whole search space. The above-described control information configuration and detection related operation can be applied even to operations to be described later. The above-described URLLC indicator information can be applied even to a method for other mMTC services. Further, it is possible to use a reserved resource indicator that is an indicator providing notification of a space in which resources are not used for a specific service in future.

On the other hand, the above-described control information type n (here, n is a certain natural number value) can be used as the term of the n-th control information type, and the same concept is applied to even operations to be described later.

Figure 9:
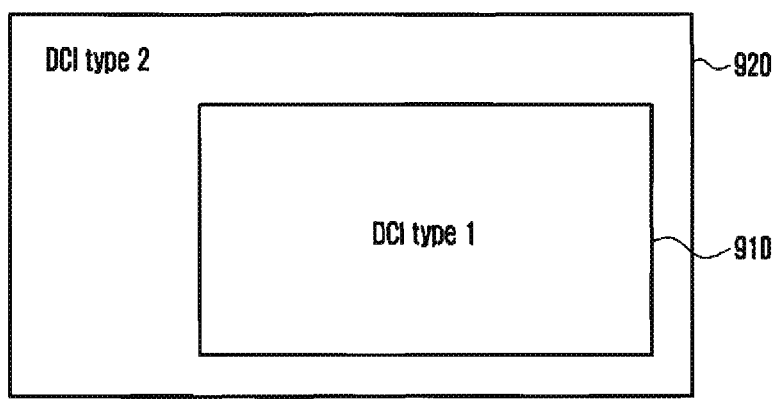
FIG. 9 is a diagram illustrating another example of a control information structure according to an embodiment of the disclosure.

FIG. 9 is a diagram illustrating another example of a control information structure according to an embodiment of the disclosure.

With reference to FIG. 9, the first control information type 910 may be included in the second control information type 920. In this case, the first control information type 910 may be included in the second control information type 920 without changing detailed information used in the first control information type 910 and the number of related allocated bits. Further, information that is not used in the first control information type 910 may be added to the second control information type 920. For example, information that is necessary only for retransmission, such as the URLLC indicator, may be included in the second control information type 920. If the number of bits used for the first control information type 910 is x, the number of bits for the second control information 910 may be x+y. In this case, y may include information additionally necessary for the retransmission or information additionally necessary in case that one service includes another service even during the initial transmission. As described above, if the control information types 910 and 920 having different numbers of bits exist, the terminal should perform decoding on the assumption of the corresponding numbers of bits. For example, it is necessary to perform decoding twice, that is, it is necessary to perform decoding once in a situation where the corresponding control information type 910 has x bits and to perform decoding once in a situation where the control information type 920 has x+y bits. That is, in such a situation, the number of times of decoding may be increased in proportion to the number of control information types that should be determined by the terminal.

Figure 10:
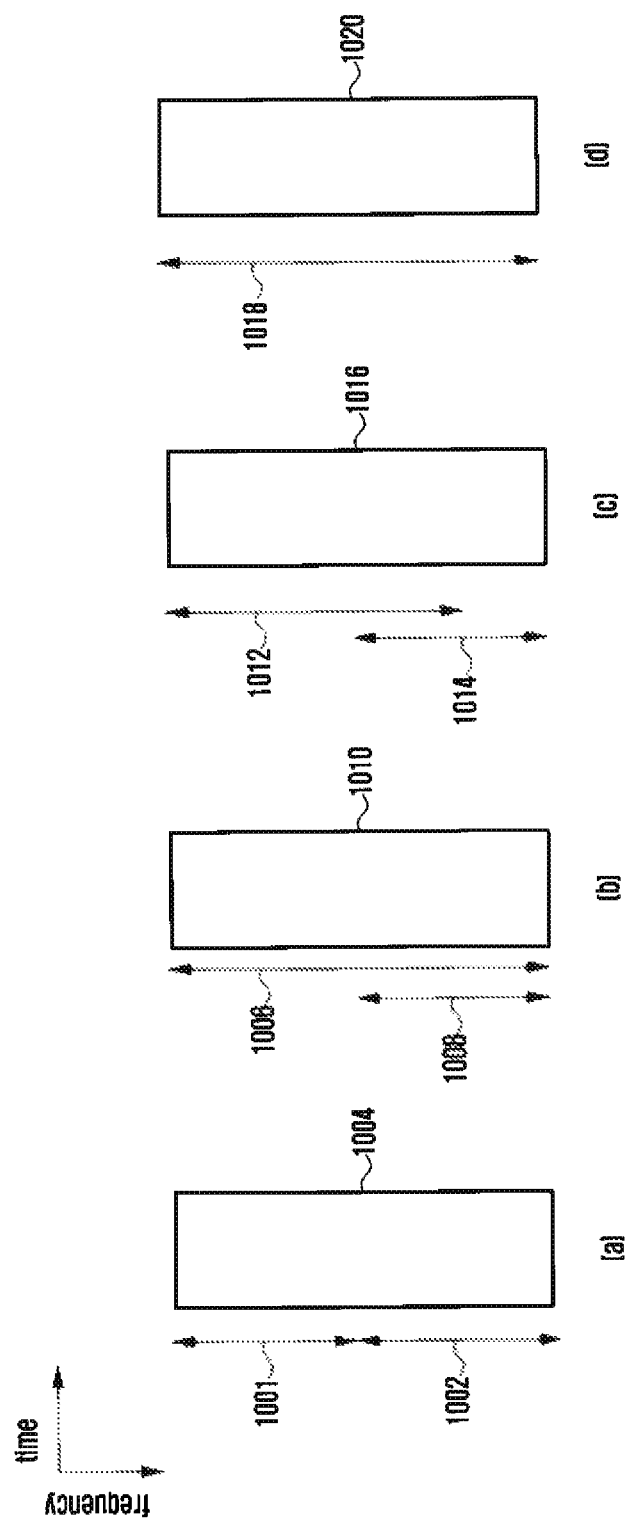
FIG. 10 is a diagram illustrating a control region from the viewpoint of frequency for identifying a control information type according to an embodiment of the disclosure.

FIG. 10 is a diagram illustrating a control region from the viewpoint of frequency for identifying a control information type according to an embodiment of the disclosure.

With reference to (a) of FIG. 10, in one cell or one base station, a first frequency bandwidth 1001 and a second frequency bandwidth 1002 may be included in the system frequency bandwidth or a frequency bandwidth 1004 that can be supported by a terminal. In the first frequency bandwidth 1001, only control information type 1 is transferred to the corresponding terminal; and in the second frequency bandwidth 1002, control information type 2 is transferred to the corresponding terminal. That is, the terminal searches for different control information types through different frequency bandwidths 1001 and 1002. As described above, one base station can divide the supported frequency bandwidth 1004 into a plurality of frequency bandwidths 1001 and 1002, and it can transmit separate control information types to the terminal in the respective frequency bandwidths. Further, in the case of using only the first frequency bandwidth 1001, the terminal can search for only the corresponding control information type 1. Further, in the case of using only the second frequency bandwidth 1002, the terminal can search for only the corresponding control information type 2. The search for the control information type 1 or the control information type 2 means a decoding process in which the terminal performs decoding to obtain the control information on the assumption that the control information type 1 or the control information type 2 is generated in the corresponding frequency bandwidth 1001 or 1002. For example, the search for the control information type 1 means that the terminal performs decoding to obtain the control information in the first frequency bandwidth 1001 that is the frequency bandwidth corresponding to the control information 1. The control information type 1 and the control information type 2 mean that the control information may have different configurations, and it can be considered that they explicitly have different numbers of bits or implicitly have the same number of bits, but they have different numbers of bits for supporting the detailed functions in the control information.

With reference to (b) of FIG. 10, in one cell or one base station, a first frequency bandwidth 1006 and a second frequency bandwidth 1008 may be included in the system frequency bandwidth or a frequency bandwidth 1010 that can be supported by a terminal. Further, the first frequency bandwidth 1006 may include the second frequency bandwidth 1008. In the first frequency bandwidth 1006, the terminal can search for control information type 1, and in the second frequency bandwidth 1008, the terminal can search for control information type 2. In this case, because the second frequency bandwidth 1008 is included in the first frequency bandwidth 1006, the terminal should actually search for both the control information type 1 and the control information type 2 in the second frequency band 1008.

With reference to (c) of FIG. 10, in one cell or one base station, a first frequency bandwidth 1012 and a second frequency bandwidth 1014 may partially overlap and may be included in the system frequency bandwidth or a frequency bandwidth 1016 that can be supported by a terminal. In the first frequency bandwidth 1012, the terminal can search for control information type 1, and in the second frequency bandwidth 1014, the terminal can search for control information type 2. With reference to (c) of FIG. 10, the terminal can search for the control information type 1 in a region where only the first frequency bandwidth 1012 exists, and the terminal can search for the control information type 2 in a region where only the second frequency bandwidth 1014 exists. Further, in a portion where the first frequency bandwidth 1012 and the second frequency bandwidth 1014 partially overlap each other, the terminal searches for both the control information type 1 and the control information type 2.

In FIG. 10, it is exemplified that the frequency bandwidth is divided into two frequency bandwidths and includes two control information types, but the number of divided frequency bandwidths is not limited thereto. For example, two or more frequency bandwidths can be included in the system frequency bandwidth or the frequency bandwidth that can be supported by the terminal, and two or more values can be applied as the control information types. Further, it is also possible that two or more control information types exist in a certain specific frequency bandwidth. Further, it is also possible that the control information type does not exist in the certain specific frequency bandwidth. Further, the frequency bandwidth can be considered as the frequency bandwidth to which the control information or data information is allocated. Further, the above-described portion explained as the frequency bandwidth can be conceptually changed to a time and space bandwidth to provide an explanation. Further, a frequency bandwidth portion to be described later can be conceptually changed to the time and space bandwidth to provide an explanation. Further, the frequency bandwidth configuration range can be explained even as a physical bandwidth or a logic bandwidth. For example, the first frequency bandwidth allocated to one terminal can be explained as a dispersed frequency bandwidth rather than a continuous frequency bandwidth. Further, the first frequency bandwidth and the second frequency bandwidth as described above can be considered as a bandwidth using different numerologies. Further, the first frequency bandwidth and the second frequency bandwidth as described above can be considered as a bandwidth using different subcarrier spacings.

Further, with reference to (d) of FIG. 10, in the whole system frequency bandwidth or the whole frequency bandwidth 1020 that can be supported by one terminal, only one frequency bandwidth 1018 supporting only one specific control information type may exist. That is, a situation where either the first frequency bandwidth or the second frequency bandwidth exists may be considered.

Although the above-described frequency bandwidths are described as frequency bandwidths supported by one cell or one base station, a corresponding proposed concept can be applied in common (or individual) frequency bandwidths operated by several base stations. Further, the present concept can be applied even in a situation where carrier aggregation is supported.

Figure 11:
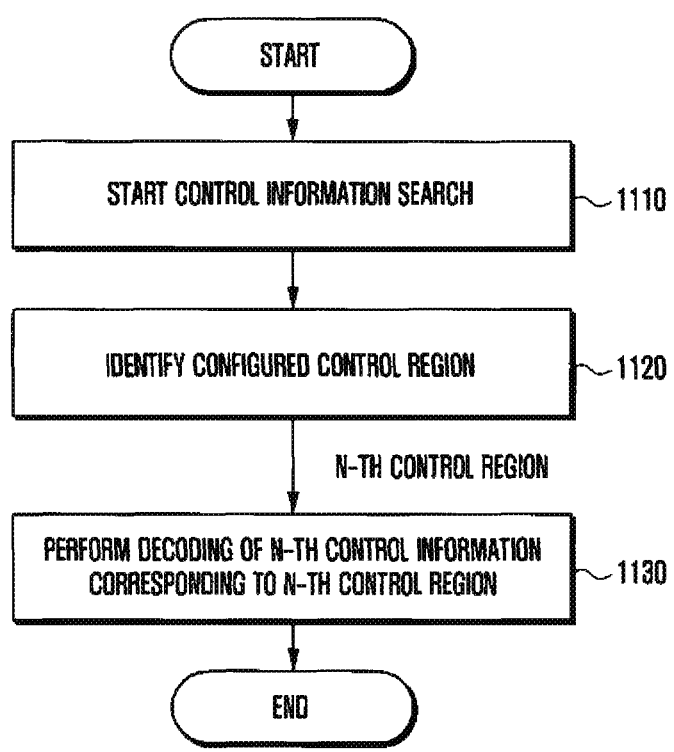
FIG. 11 is a block diagram explaining an operation process of a control region based terminal for identifying a control information type according to a first embodiment of the disclosure.

FIG. 11 is a block diagram explaining an operation process of a control region based terminal for identifying a control information type according to a first embodiment of the disclosure.

With reference to FIG. 11, at operation 1110, a terminal may start a control information search to examine whether there is a resource allocated to the terminal itself at a given control information search interval.

Further, in order to determine the type of control information before decoding the corresponding control information at the control information search interval, the terminal, at operation 1120, can identify a control region in which the terminal itself can search for the control information in one cell or one base station. For this, the terminal can newly establish the control region in which the terminal can search for the control information, or can identify a predetermined control region. The control region can be mapped to the corresponding frequency bandwidth, and this can be initially configured as system information. Further, according to embodiments, information on the control region may be configured or changed through RRC signaling, MAC CE, or L1 signaling. That is, the frequency bandwidths corresponding to all control regions may always be equal to or may be different from one another. Further, several control regions may physically share parts of the frequency bandwidths.

Thereafter, at operation 1130, the terminal can search for the control information in the corresponding configured control region. For example, in the n-th control region, the terminal can recognize in advance occurrence of the n-th control information (or control information type n), and can decode the n-th control information. The configurable control regions can partially or completely overlap each other in the frequency bandwidths from the physical or logic viewpoint. In the overlapping portion, the terminal can perform decoding on the assumption that control information corresponding to the number of overlapping regions occurs. For example, if two control regions partially overlap each other, the terminal can perform decoding on the assumption that two pieces of control information occur in the overlapping region. Further, according to embodiments, in one control region, one piece of control information or two or more different pieces of control information may exist.

Figure 12:
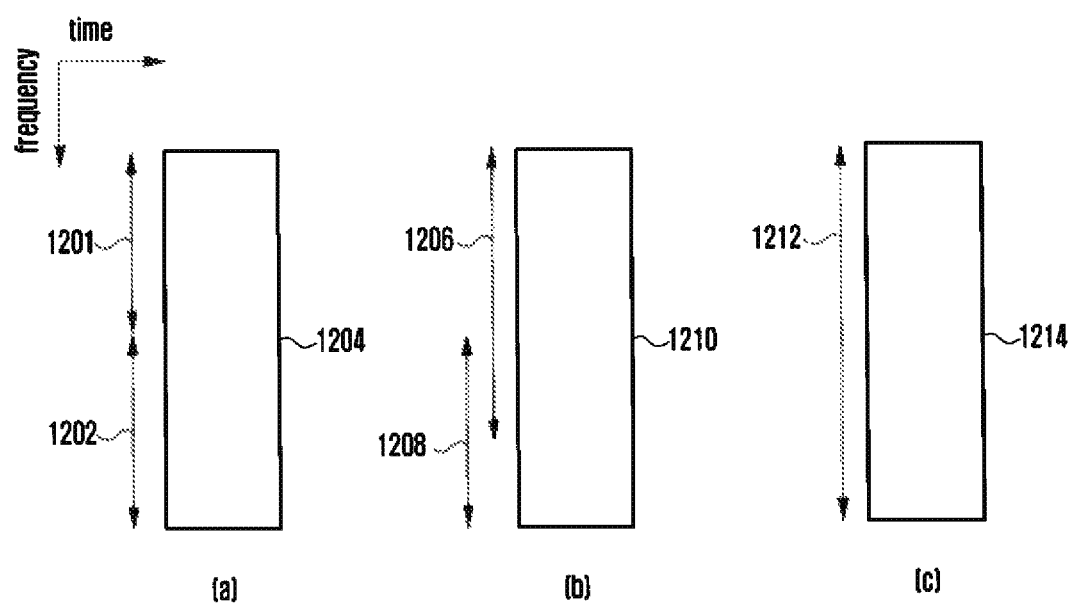
FIG. 12 is a diagram illustrating a data region from the viewpoint of frequency for identifying a control information type according to an embodiment of the disclosure.

FIG. 12 is a diagram illustrating a data region from the viewpoint of frequency for identifying a control information type according to an embodiment of the disclosure.

With reference to FIG. 12, the terminal can identify the corresponding control information type based on data region resource information scheduled to the terminal itself before the control information type identification time.

With reference to (a) of FIG. 12, a first frequency bandwidth 1201 and a second frequency bandwidth 1202 may be included in the system frequency bandwidth or a frequency bandwidth 1204 that can be supported by a terminal. In this case, if data scheduled to the terminal occurs in the first frequency bandwidth 1201, the terminal can identify control information type 1 in a control region configured to the terminal itself. Further, if the data scheduled to the terminal occurs in the second frequency bandwidth 1202, the terminal can identify control information type 2 in the control region configured to the terminal itself. In this case, the frequency regions 1201 and 1202 to which respective scheduled data belong may be discriminated from each other. If all or a part of the scheduled data is included in the first frequency band 1201 and the second frequency band 1202, the terminal can search for the control information mapped to the corresponding frequency bandwidth. For example, if the data scheduled to the terminal is allocated to both the first frequency bandwidth 1201 and the second frequency bandwidth 1202, the terminal can search for both control information type 1 and control information type 2 in the control information region allocated to the terminal itself.

With reference to (b) of FIG. 12, a first frequency bandwidth 1206 and a second frequency bandwidth 1208 may be included in the system frequency bandwidth or a frequency bandwidth 1210 that can be supported by a terminal. Further, the first frequency bandwidth 1206 and the second frequency bandwidth 1208 may partially overlap each other in the system frequency bandwidth or the frequency bandwidth 1210 that can be supported by the terminal. In this case, if data scheduled to the terminal occurs in a portion that belongs to only the first frequency bandwidth 1206, the terminal searches for control information type 1 in a control region configured to the terminal itself. Further, if the data scheduled to the terminal occurs in a portion that belongs to only the second frequency bandwidth 1208, the terminal searches for control information type 2 in the control region configured to the terminal itself. If the data scheduled to the terminal occurs in a portion in which the first frequency bandwidth 1206 and the second frequency bandwidth 1208 overlap each other, the terminal can search for both the control information type 1 and control information type 2 in the control information region allocated to the terminal itself.

With reference to (c) of FIG. 12, data scheduled in the whole system frequency band or the frequency band 1214 that can be used by the terminal may exist only in one frequency band 1212. In this case, the terminal can search for only one control information type in the control information region allocated to the terminal itself.

In FIG. 12, it is exemplified that the frequency bandwidth is divided into two frequency bandwidths, and includes two control information types, but the number of divided frequency bandwidths is not limited thereto. For example, two or more frequency bandwidths can exist in the whole system frequency bandwidth or the frequency bandwidth of the terminal, and two or more control information types can be generated in one frequency bandwidth. That is, two or more values can be applied in the above-described frequency bandwidth, and two or more values of data information can also be applied. Further, two or more control information types can exist in a certain specific frequency bandwidth. Further, it is also possible that the control information type does not exist in the certain specific frequency bandwidth. Further, the frequency bandwidth can be considered as the frequency bandwidth to which the control information or data information is allocated. Further, the above-described portion explained as the frequency bandwidth can be conceptually changed to a time and space bandwidth to provide an explanation. Further, a frequency bandwidth portion to be described later can be conceptually changed to the time and space bandwidth to provide an explanation. Further, the frequency bandwidth configuration range can be explained even as a physical bandwidth or a logic bandwidth. For example, the first frequency bandwidth allocated to one terminal can be explained as a dispersed frequency bandwidth rather than a continuous frequency bandwidth. Further, the first frequency bandwidth and the second frequency bandwidth as described above can be considered as the bandwidth using different numerologies. Further, the first frequency bandwidth and the second frequency bandwidth as described above can be considered as a bandwidth using different subcarrier spacings.

Although it is described that the control information type 1 mapped to the first frequency bandwidth as described above and the control information type 2 mapped to the second frequency bandwidth can be respectively used based on the search, the remainder excluding the corresponding control information types can also be searched for. For example, if the control region or the data region exists in the first frequency bandwidth, the terminal may search for only the control information type 1, or it may perform a search excluding the control information type 1. In a similar manner, if the control region or the data region exists in the second frequency bandwidth, the terminal may search for only the control information type 2, or it may perform a search excluding the control information type 2. Further, if the control region or the data region exists in the frequency bandwidth of a specific type, the terminal can exclude the search for one or more control information types corresponding to this. The above-described concept can correspond to common application of the previously described operation concept and the operation concept to be described later.

Figure 13:
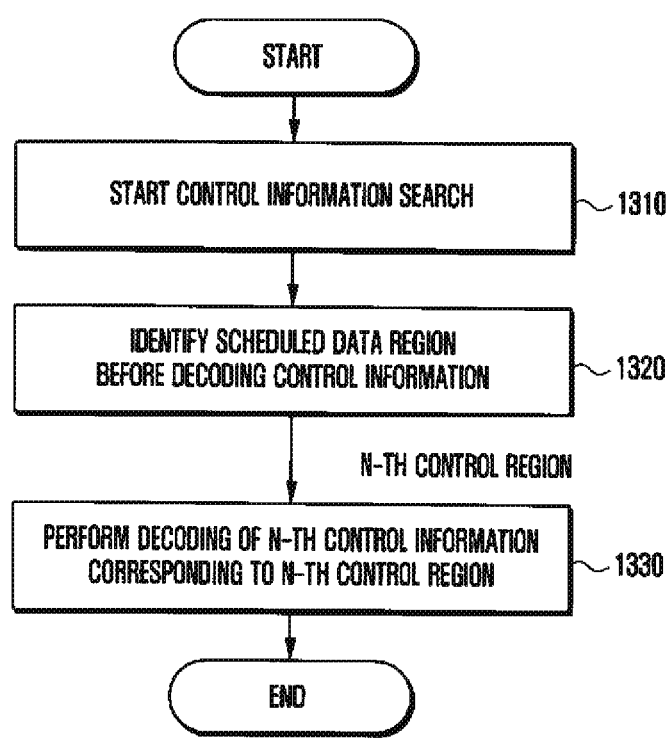
FIG. 13 is a block diagram explaining an operation process of a data region based terminal for identifying a control information type according to a second embodiment of the disclosure.

FIG. 13 is a block diagram explaining an operation process of a data region based terminal for identifying a control information type according to a second embodiment of the disclosure.

With reference to FIG. 13, at operation 1310 a terminal can start a control information search.

Further, in order to determine the type of the control information before decoding the corresponding control information at the control information search interval, the terminal, at operation 1320 can identify a frequency region (data region) to which a previously scheduled data resource is allocated.

Thereafter, at operation 1330, the terminal can decode the control information corresponding to the frequency region to which the data resource is allocated in the control region allocated to the terminal. For example, if the frequency region to which the data resource is allocated is the frequency region belonging to the n-th data region, the terminal can assume the n-th control information (or control information type n) and can perform decoding in the control region allocated to the terminal. The frequency bandwidth to which the scheduled data resource is allocated corresponds to values existing over one cell or one base station. The frequency bandwidth in which the data region exists may exist only in one specific frequency bandwidth or in a plurality of specific frequency bandwidths. For example, if the frequency bandwidth, in which the data region exists, exists in two frequency bandwidths, two pieces of control information corresponding to the two frequency bandwidths can be decoded.

Figure 14:
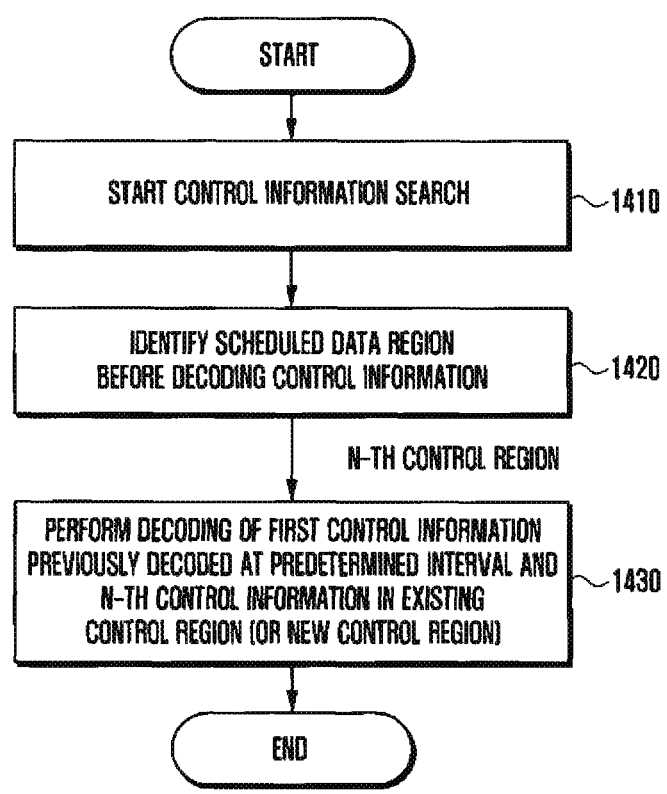
FIG. 14 is a block diagram explaining an operation process of a data region based terminal for identifying a control information type according to a third embodiment of the disclosure.

FIG. 14 is a block diagram explaining an operation process of a data region based terminal for identifying a control information type according to a third embodiment of the disclosure.

With reference to FIG. 14, at operation 1410 a terminal can start a control information search.

Further, in order to determine the type of the control information before decoding the corresponding control information at the control information search interval, the terminal, at operation 1420, can identify a frequency region (data region) to which a previously scheduled data resource is allocated.

Thereafter, at operation 1430, the terminal can additionally decode the control information corresponding to the frequency region to which the data resource is allocated in the control region allocated to the terminal. For example, if the frequency region to which the data resource is allocated is the frequency region belonging to the n-th data region, the terminal can assume the n-th control information (or control information type n) and can additionally perform decoding at a predetermined interval. That is, the terminal additionally performs decoding of the n-th control information type at the predetermined interval in addition to that being performed for the existing control information type (e.g., first control information). The predetermined interval means a period of k TTIs from a certain time after the data is scheduled, and the corresponding TTI unit may be a mini-slot unit, slot unit, or subframe unit.

Figure 15:
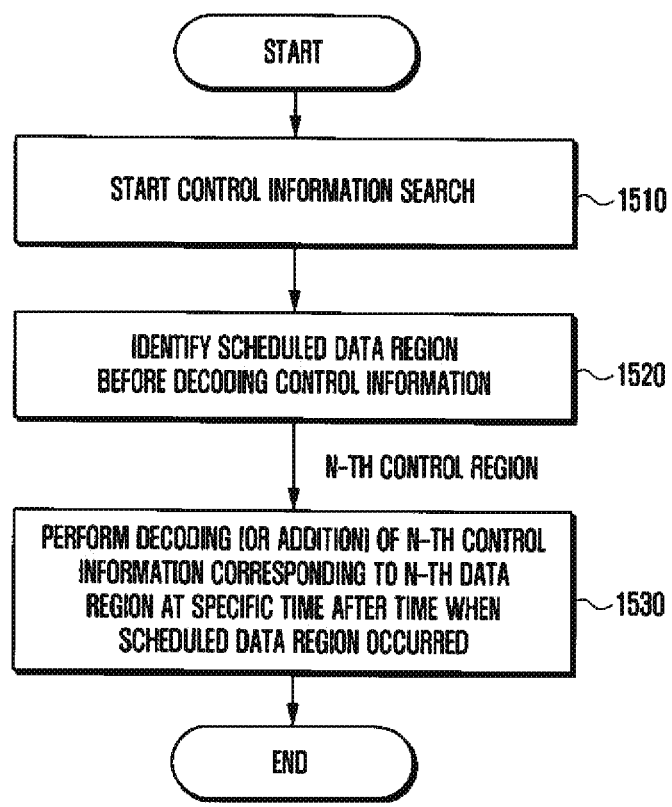
FIG. 15 is a block diagram explaining an operation process of a data region based terminal for identifying a control information type according to a fourth embodiment of the disclosure.

FIG. 15 is a block diagram explaining an operation process of a data region based terminal for identifying a control information type according to a fourth embodiment of the disclosure.

With reference to FIG. 15, at operation 1510 a terminal can start a control information search.

Further, in order to determine the type of the control information before decoding the corresponding control information at the control information search interval, the terminal, at operation 1520, can identify a frequency region (data region) to which a previously scheduled data resource is allocated.

Thereafter, at operation 1530, the terminal can decode the control information corresponding to the frequency region at a specific time after the frequency region to which the data resource is allocated. For example, if the frequency region to which the data resource is allocated is the frequency region belonging to the n-th data region, the terminal can assume the n-th control information (or control information type n) corresponding to the n-th data region that is the data region at the specific time (e.g., time after k time) after the n-th data region, and can perform decoding. In this case, the specific time may be the time of the k-th TTI after the data is scheduled, and the corresponding TTI unit may be a mini-slot unit, slot unit, or subframe unit.

Figure 16:
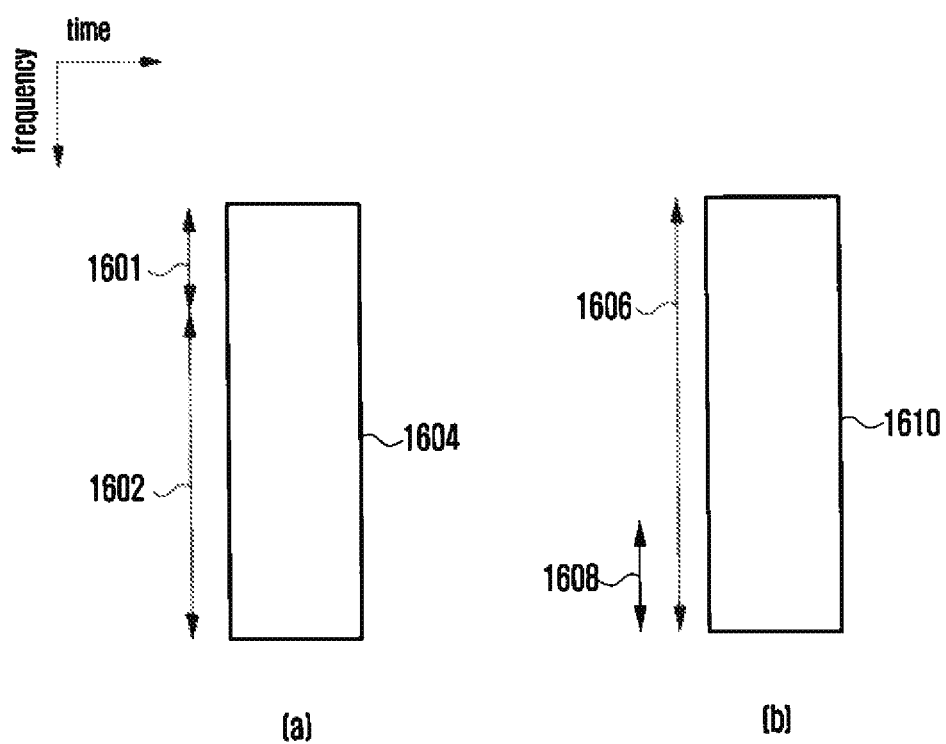
FIG. 16 is a diagram illustrating a frequency ratio supporting a specific service, a specific numerology, or a specific type for identifying a control information type according to an embodiment of the disclosure.

FIG. 16 is a diagram illustrating a frequency ratio supporting a specific service, a specific numerology, or a specific type for identifying a control information type according to an embodiment of the disclosure.

With reference to (a) of FIG. 16, a first frequency bandwidth 1601 and a second frequency bandwidth 1602 may have discriminated frequencies, and they may exist in the whole system frequency bandwidth or a frequency bandwidth 1604 that can be supported by one terminal.

The first frequency bandwidth 1601 is used to search for control information type 1, and the second frequency bandwidth 1602 is used to search for control information type 2. In this case, if the ratio of the specific frequency bandwidth to the whole system frequency bandwidth or the frequency bandwidth 1604 that can be supported by one terminal is equal to or higher than a predetermined threshold value, the terminal can search for only the control information type mapped to the specific frequency band 1602. For example, if the occupancy rate of the second frequency bandwidth 1602 in the whole system frequency bandwidth or the whole frequency bandwidth 1604 that can be used by the terminal is equal to or higher than the predetermined threshold value as compared with the other frequency bandwidth 1601, the terminal can use the control information type 2 that is the control information type supported in the second frequency band 1602 in the first frequency bandwidth 1601 as well as in the second frequency bandwidth 1602. That is, the control information regions that are not mapped to the specific frequency bandwidth 1602 may not be searched for.

With reference to (b) of FIG. 16, a first frequency bandwidth 1606 and a second frequency bandwidth 1608 may partially overlap each other in the whole system frequency bandwidth or the whole frequency bandwidth 1610 that can be used by the terminal.

In this case, if the occupancy rate (alpha) of a specific type of frequency bandwidth 1606 in the whole system frequency bandwidth or the whole frequency bandwidth 1610 that can be used by the terminal is higher (or lower) than the occupancy rate (beta) of other types of frequency bandwidths 1608 in the whole system frequency bandwidth or the whole frequency bandwidth 1610 that can be used by the terminal for a predetermined threshold value or more (i.e., alpha−beta>threshold), the terminal can search for only the control information type mapped to the specific frequency bandwidth 1606 even in the region 1608 that does not include the specific frequency bandwidth 1606. Further, the terminal may not search for the control information type that is not mapped to the specific frequency bandwidth 1606. For example, if the occupancy rate (alpha) of the first frequency bandwidth 1606 in the whole frequency bandwidth 1610 is higher than the occupancy rate (beta) of the second frequency bandwidth 1608 in the whole system frequency bandwidth 1610 by the predetermined threshold value or more, the terminal can use control information type 1 that is the control information type that can be supported in the first frequency bandwidth 1606 in even the second frequency bandwidth 1608 as well as in the first frequency bandwidth 1606. That is, the terminal may not search for the control information regions that are not mapped to the specific frequency bandwidth 1606. Further, according to embodiments, as an opposite operation to that as described above, it is also possible that the terminal searches for only the control information regions that are not mapped to the specific frequency bandwidth 1606 and does not search for only the control information regions mapped to the specific frequency bandwidth 1606.

The above-described frequency bandwidth can be considered as the frequency bandwidth for a specific service, the frequency bandwidth supporting a specific numerology, or the frequency bandwidth that can be used for other purposes. Further, the frequency bandwidth can be considered as the frequency bandwidth to which the control region belongs or the bandwidth to which the data region belongs. For example, if it is assumed to that 15 kHz subcarrier spacing is used for eMBB service, and 60 kHz subcarrier spacing is used for eMBB and URLLC services, the frequency bandwidths to which respective subcarrier spacings are applied may partially overlap each other or may not overlap each other. In such a situation, if the frequency bandwidth allocated to 15 kHz subcarrier spacing supporting only the eMBB service occupies a larger portion in the whole system frequency bandwidth as compared with the frequency bandwidth allocated to 60 kHz subcarrier spacing supporting the eMBB and URLLC services, in the case of an eMBB terminal, there is a high possibility that some data transmission breakdown effects due to the URLLC data occurrence appear, and the above-described URLLC indicator may not be necessary for the control information indicating the retransmission.

Accordingly, in this case, the terminal will search for the control information having no URLLC indicator regardless of the frequencies supporting respective services. In an opposite situation, if the frequency bandwidth allocated to 60 kHz subcarrier spacing supporting the eMBB and URLLC services occupies a larger portion in the whole system frequency bandwidth as compared with the frequency bandwidth allocated to 15 kHz subcarrier spacing supporting only the eMBB service, in the case of the eMBB terminal, there is a high possibility that data transmission breakdown effects due to the URLLC data occurrence appear frequently. Accordingly, in this case, it is profitable from the viewpoint of terminal power consumption for the terminal to perform the search in consideration of the retransmission related control information that always includes the URLLC indicator.

In addition, for the terminal supporting a service such as mMTC, it is possible to provide a method that supports a determination on whether to undertake a search for specific control information in consideration of the frequency bandwidth ratio. Although a situation where two frequency bandwidths exist has been described with reference to FIG. 16, the above-described operation can be performed even in a situation where two or more frequency bandwidths exist.

Figure 17:
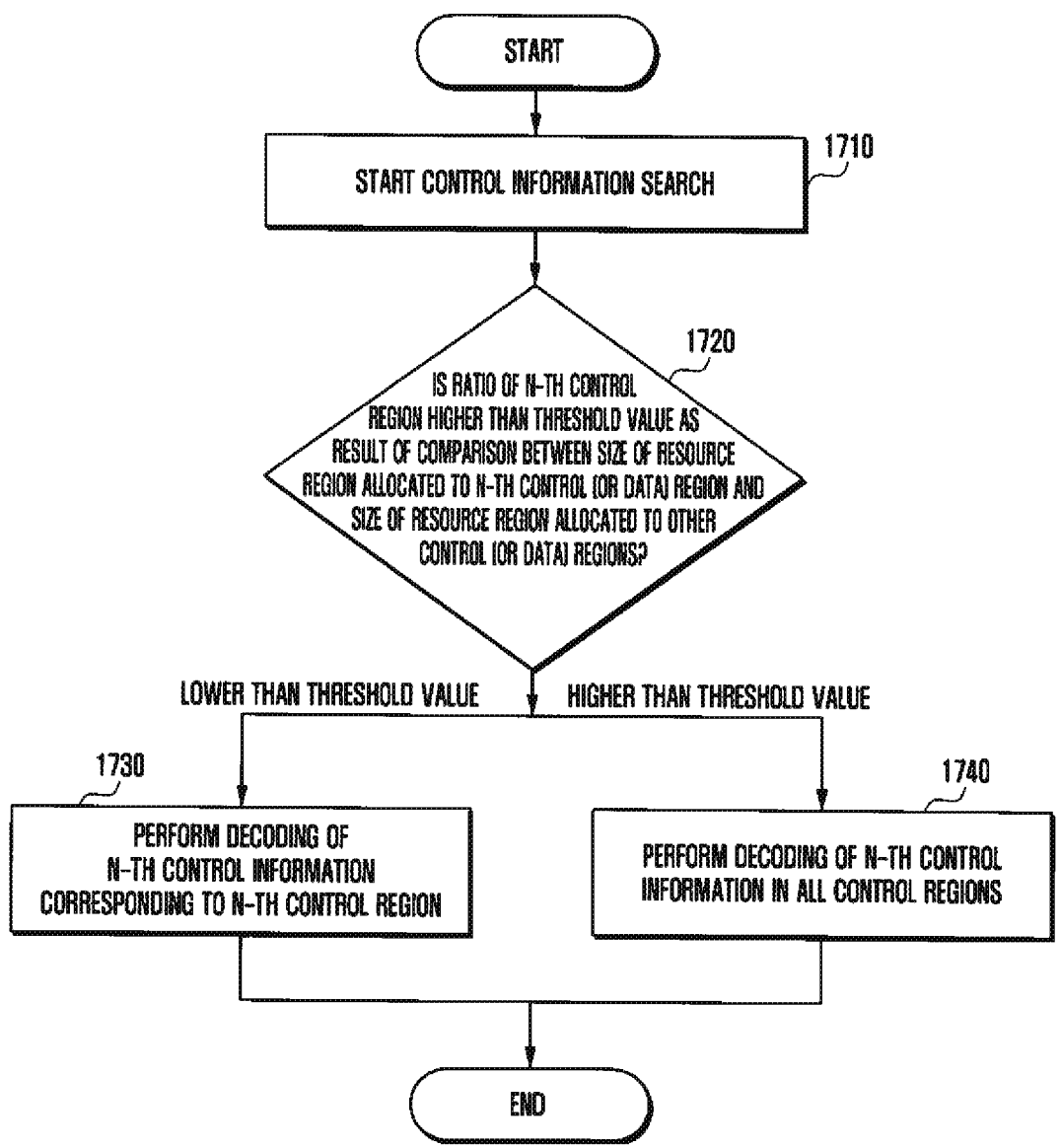
FIG. 17 is a block diagram explaining an operation process of a frequency ratio based terminal for identifying a control information type according to a fifth embodiment of the disclosure.

FIG. 17 is a block diagram explaining an operation process of a frequency ratio based terminal for identifying a control information type according to a fifth embodiment of the disclosure.

With reference to FIG. 17, at operation 1710 a terminal can start a control information search in a control region.

Further, before searching for the control information type corresponding to the control region, the terminal, at operation 1720, can compare the size of a resource (frequency) allocated to the n-th control region (or data region) with the size of a resource region allocated to another control region (or data region) excluding the n-th control region (or data region). Further, the terminal can determine whether the ratio of the n-th control region is equal to or higher than a threshold value.

In this case, the terminal can determine whether the occupancy rate of the n-th control region (or data region) is equal to or higher than a predetermined threshold value in the whole system frequency bandwidth or the frequency bandwidth that can be used by the terminal as compared with other control regions. Further, the terminal can determine whether the occupancy rate (alpha) of the n-th control region (or data region) in the whole system frequency bandwidth or the frequency bandwidth that can be used by the terminal is higher (or lower) than a combination of the occupancy rates (beta_1, beta_2, . . . , beta_k) of other control regions (sum, product, combination of the sum and the product, or combination of other arithmetic operations) in the whole system frequency bandwidth or the frequency bandwidth that can be used by the terminal. In this case, as an example, the above-described rates can be simply obtained by applying an equation [alpha−(beta_1+beta_2+ . . . +beta_k)>threshold].

If the rate of the n-th control region is equal to or higher than the threshold value, the terminal, at operation 1740, can support a search for the n-th control information mapped to the n-th control region (or data region) in the whole system frequency bandwidth or the frequency bandwidth that can be used by the terminal. That is, if the resultant value obtained through comparison of the frequency rates occupied by the corresponding types is equal to or larger than a predetermined threshold value, the terminal can search for and decode the n-th control information in all the control regions (or all frequency bandwidths). In contrast, according to embodiments, the terminal can also exclude only the n-th control information mapped to the n-th control region (or data region) from the search.

Further, if the rate of the n-th control region is not higher than the predetermined threshold value, the terminal, at operation 1730, can search for and decode the n-th control information in the frequency bandwidth corresponding to the n-th control region.

In the frequency bandwidth corresponding to the n-th control region (or data region) as described above and the frequency bandwidth corresponding to another control region, different numerologies or the same numerology can be used. Further, it is possible to use two or more numerologies in the frequency bandwidth corresponding to the n-th control region (or data region).

Figure 20:
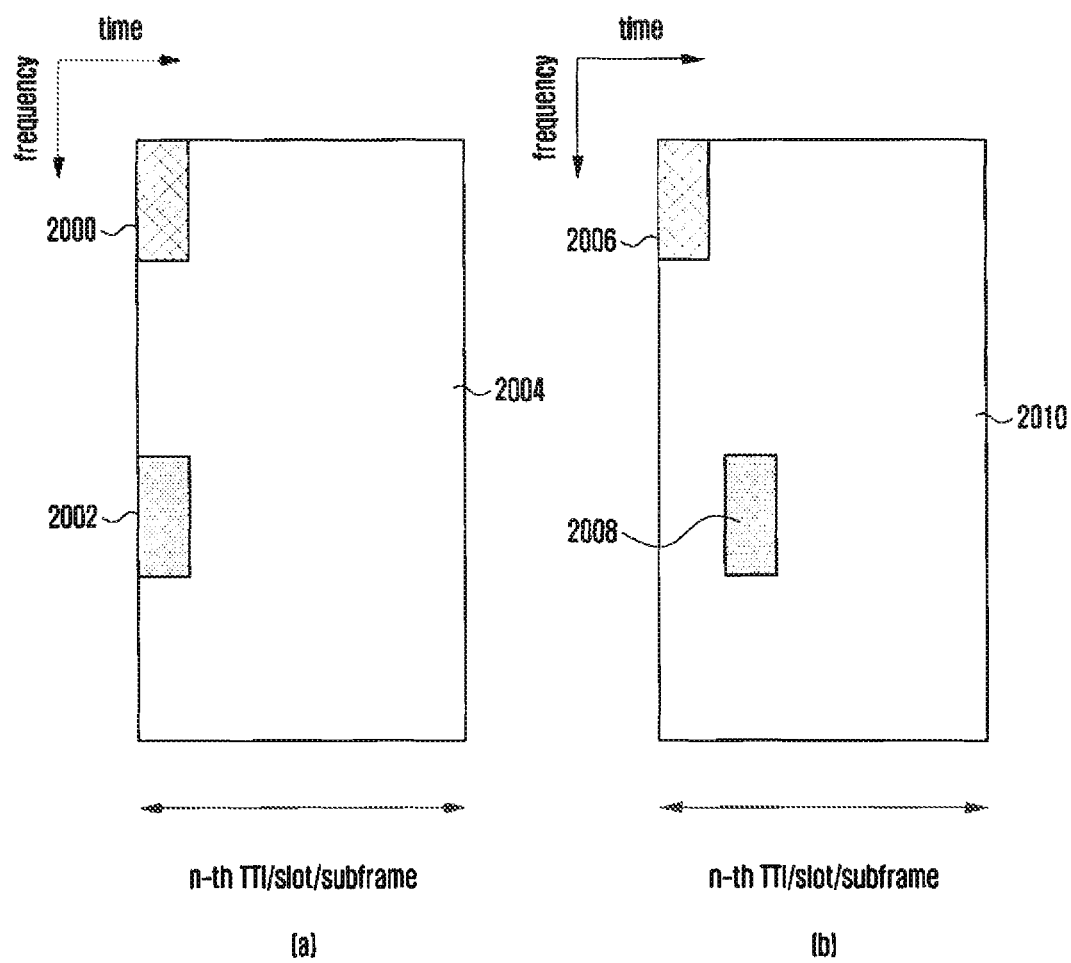
FIG. 20 is a diagram illustrating control information regions by operations for identifying a control information type according to a sixth embodiment of the disclosure.

FIG. 20 is a diagram illustrating control information regions by operations for identifying a control information type according to a sixth embodiment of the disclosure.

With reference to FIG. 20, control information regions according to a sixth embodiment of the disclosure are disclosed.

In order to obtain configuration information of a data region, such as HARQ process number, RV, and MCS, the terminal can dividedly examine control information in two stages. With reference to (a) of FIG. 20, the terminal searches for a primary control region 2000. The primary control region may be a control region configured by groups composed of all or some terminals or by individual terminals. Further, a search region in which the primary control region 2000 is configured can be located at time or frequency intervals different from those of the data region 2004. Through the search for the primary control region 2000, the terminal obtains the control information type to be searched for in a secondary control region 2002. The control information type that is searched for in the primary control region 2000 can be identified through system information while the terminal is initially attached or is re-attached to the system, or the control information type can be identified in advance through higher signaling, such as RRC or MAC CE. On the assumption of the control information type being obtained through the primary control region 2000, the terminal performs the search in the secondary control region 2002. The number of types of control information that can be obtained can be configured to n or more or less, and one obtained control information type or a set of obtained control information types may be provided. For example, if 10 control information types exist, the control information types to be obtained by the terminal in the secondary control information region through the primary control information region may be {first control information, third control information, fifth control information}. That is, the number of sets of control information types can be variously configured in the range of 1 to n. The above-described scheme can be supported through configuration of one of sets preconfigured through a bitmap method or higher signaling. Further, it is also possible for the terminal to examine only one of two control information types in total as 1-bit information. As the location of the secondary control information region 2002, it may have the same time and frequency intervals as those of the primary control information region 2000, or it may have different time and frequency intervals from those of the primary control information region 2000 as shown as (b) of FIG. 20. Further, in contrast with FIG. 20, the search regions of the primary and secondary control information regions can be located at two or more different time and frequency intervals rather than at one time and frequency interval. Further, as the locations of the primary and secondary control information regions, they can be independently deployed and can exist in locations that are the same as or different from the locations of the time and frequency intervals to which the data region belongs.

If the primary control information does not exist in any one slot, subframe, or control information search period examined by the terminal, or if the primary control information decoding has failed even though the primary control information exists, the terminal can search for set(s) of control information types pre-indicated through higher signaling, such as SIB, RRC, and MAC CE in the secondary control information region. Further, if the primary control information does not exist in any one slot, subframe, or control information search period examined by the terminal, or if the primary control information decoding has failed even though the primary control information exists, the terminal can search for set(s) of control information types transferred from the primary control information region most recently received in the secondary control information region. Further, if the primary control information does not exist in any one slot, subframe, or control information search period examined by the terminal, or if the primary control information decoding has failed even though the primary control information exists, the terminal can search for all the control information types that should be basically examined in the secondary control information region. Further, if the primary control information does not exist in any one slot, subframe, or control information search period examined by the terminal, or if the primary control information decoding has failed even though the primary control information exists, the terminal may not search for the secondary control information region.

As an example, in the primary control information region, the base station can notify the terminal that a second service type that disturbs transmission of a first service type in the previous transmission has occurred. That is, depending on whether the second service type occurs, the base station indicates to the terminal the control information type(s) that the terminal should search for in the secondary control information region through the primary control information region, and the terminal searches for the control information type(s) indicated from the base station through the primary control information region in the secondary control information region. In addition to the above-described example, as an element for determining the control information type that can be searched for through the secondary control information region, a second service type occurrence indicator, HARQ process number, the number of code blocks, the number of mini-slots, the number of mini-slot groups, or MCS size may be included. The mini-slot is in the form having OFDM symbols that are smaller than a slot. In accordance with the above-described elements, the control information type for which the terminal searches in the secondary control information region can be determined in the primary control information region. As another example, the control information type 1 and the control information type 2 can provide notification of different situations including different MCS sizes, different HARQ process sizes, and whether to include mini-slots or symbol indicators in the primary control information region. In the primary control information region, the base station can provide notification in detail of the secondary control information type for which the terminal should search. A set of secondary control information types can be predefined through higher signaling, such as RRC, MAC CE, and SIB, or values predefined by the base station and the terminal can be used. In FIG. 20, it is illustrated that the primary control information region and the second control information region are located in the same slot, TTI, or mini-slot, but it is also possible that the primary control information region and the second control information region are located in different slots, TTIs, or mini-slots.

Further, when the base station notifies the terminal whether the second service type, such as URLLC, occurs in the primary control information region, the control information types for which the terminal searches in the secondary control information region differ from each other in accordance with the corresponding occurrence. If the second service type does not occur, the terminal searches for the control information type in which an indicator for notifying of the location where the second service type occurs is not included. If the second service type occurs, the terminal searches for the control information type in which an indicator for notifying of the location where the second service type occurs is included.

Further, the whole or parts of constituent elements constituting control information, such as an HARQ process field, MCS field, RV field, resource block (RB) field, physical resource field (PRB), data information region start location symbol index field, or data region end location index field, may differ through the control information searched for in the primary control information region.

Further, all or some constituent elements constituting control information, such as an HARQ process field, MCS field, RV field, resource block (RB) field, physical resource field (PRB), data information region start location symbol index field, or data region end location index field, may differ through the control information searched for in the primary control information region.

In addition to the above-described methods, the control information type for which the terminal searches can also be transferred from the base station by RRC, SIB, or MAC CE. Two or more control information types as described above can be provided with different bit numbers or with different field configuration types in a state where the bit numbers are the same.

Figure 21:
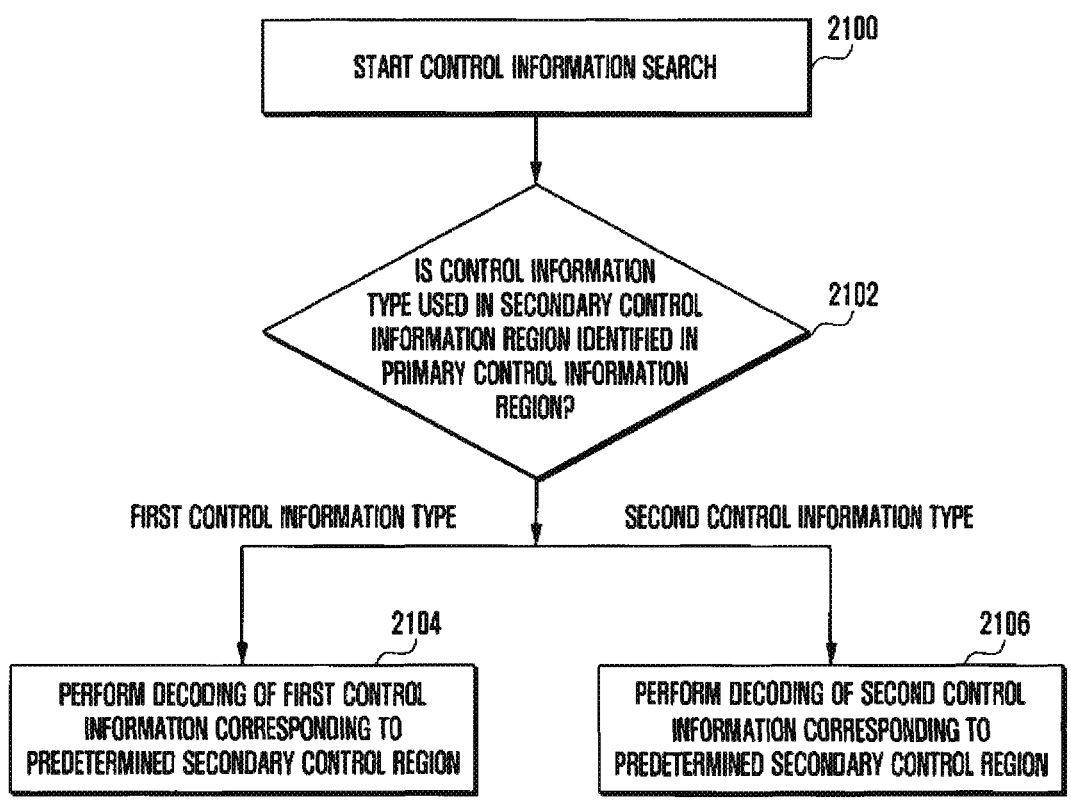
FIG. 21 is a block diagram explaining an operation process of a terminal for identifying a control information type according to a sixth embodiment of the disclosure.

FIG. 21 is a block diagram explaining an operation process of a terminal for identifying a control information type according to a sixth embodiment of the disclosure. First, the terminal starts a control information search (2100). In the primary control information region, the terminal identifies the control information type used in the secondary control information region (2102). If it is determined that the control information type is the first control information type through decoding of the control information in the primary control information region, the terminal searches for the first control information type in the secondary control information region (2104). If it is determined that the control information type is the first control information type through decoding of the control information in the primary control information region, the terminal searches for the first control information type in the secondary control information region (2106). In the above-described operation, searching for only one control information type in the secondary control region can be considered, and searching for a set of one or more control information types in the secondary control region also can be considered. Further, if the control information type used in the secondary control information region is not identified in the primary control information region (e.g., if decoding has failed, or if decoding has succeeded, but values that are different from those considered by the terminal are obtained), the terminal may search for all kinds of control information types to be examined by the terminal itself in the secondary control information region, or it may not search for the secondary control information region.

Figure 18:
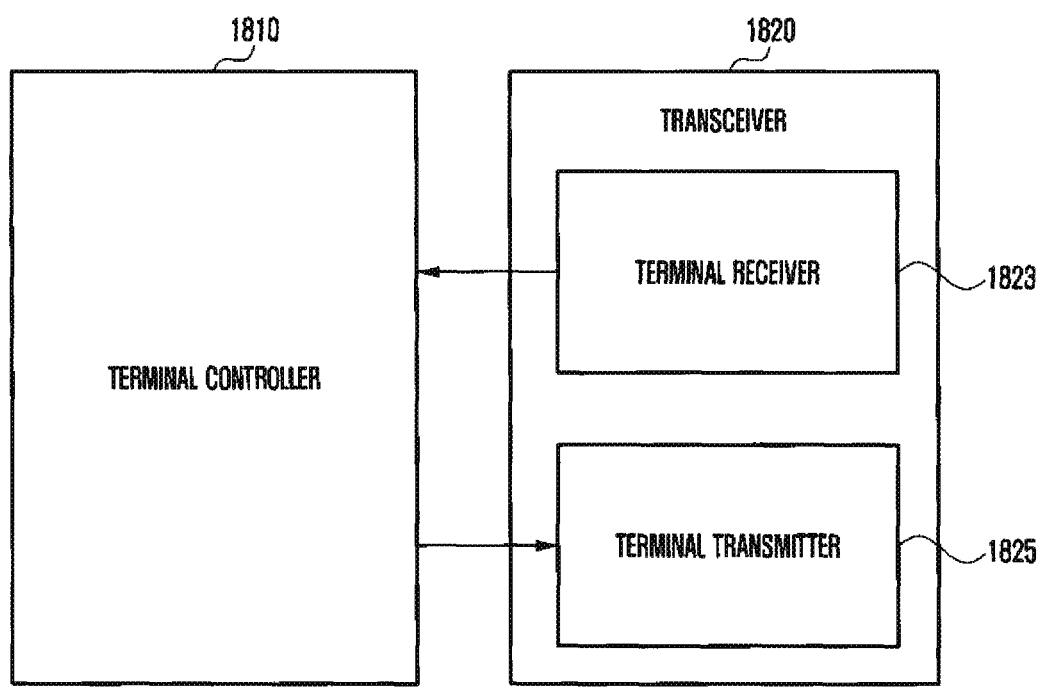
FIG. 18 is a block diagram illustrating the structure of a terminal according to an embodiment of the disclosure.

FIG. 18 is a block diagram illustrating the structure of a terminal according to an embodiment of the disclosure.

With reference to FIG. 18, a terminal according to an embodiment of the disclosure may include a transceiver 1820 and a terminal controller 1810 configured to control the overall operation of the terminal. Further, the transceiver 1820 may include a terminal receiver 1823 and a terminal transmitter 1825.

In an embodiment, the terminal receiver 1823 and the terminal transmitter 1825 may be commonly called the transceiver 1820. The transceiver 1820 may transmit and receive signals with a base station. The signal may include control information and data. For this, the transceiver 1820 may include an RF transmitter up-converting and amplifying a frequency of a transmitted signal and an RF receiver low-noise-amplifying the received signal and down-converting the frequency of the amplified signal. Further, the transceiver 1820 may receive the signal through a radio channel, output the signal to the terminal controller 1810, and transmit the signal output from the terminal controller 1810 through the radio channel.

The terminal controller 1810 may control the terminal to perform any one operation according to the embodiments of the disclosure as described above. For example, the terminal receiver 1823 receives a signal including second signal transmission timing information from the base station, and the terminal controller 1810 may control to analyze the second signal transmission timing. Thereafter, the terminal transmitter 1825 may transmit the second signal in the above-described timing.

Further, for example, the terminal controller 1810 may be a circuit, an application-specific circuit, or at least one processor. Further, the operations of the terminal can be implemented by providing a memory device in which corresponding program codes are stored on a certain constituent part in the terminal. That is, the terminal controller 1810 can execute the above-described operations by reading and executing the program codes stored in the memory device through a processor or a central processing unit (CPU).

On the other hand, it is not necessary for the terminal controller 1810 and the transceiver 1820 to be implemented by separate devices, and they can be implemented by one constituent part in the form of a single chip.

Figure 19:
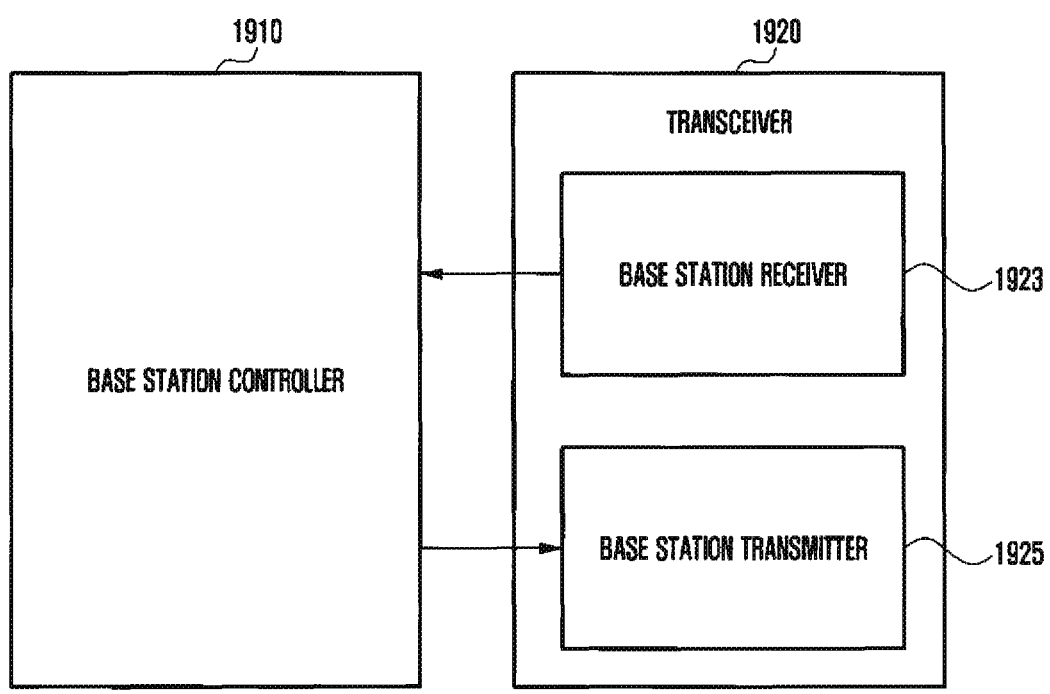
FIG. 19 is a block diagram illustrating the structure of a base station according to an embodiment of the disclosure.

FIG. 19 is a block diagram illustrating the structure of a base station according to an embodiment of the disclosure.

With reference to FIG. 19, a base station according to an embodiment of the disclosure may include a transceiver 1920 and a base station controller 1910 configured to control the overall operation of the base station. Further, the transceiver 1920 may include a base station receiver 1923 and a base station transmitter 1925.

In an embodiment of the disclosure, the base station receiver 1923 and the base station transmitter 1925 may be commonly called the transceiver 1920. The transceiver 1920 may transmit and receive signals with a terminal. The signal may include control information and data. For this, the transceiver 1920 may include an RF transmitter up-converting and amplifying a frequency of a transmitted signal and an RF receiver low-noise-amplifying the received signal and down-converting the frequency of the amplified signal. Further, the transceiver 1920 may receive the signal through a radio channel, output the signal to the base station controller 1910, and transmit the signal output from the base station controller 1910 through the radio channel.

The base station controller 1910 may control the base station to perform any one operation according to the embodiments of the disclosure as described above. For example, the base station controller 1910 may control to determine the second signal transmission timing and to generate the second signal transmission timing information to be transferred to the terminal. Thereafter, the base station transmitter 1925 may transfer the timing information to the terminal, and it may receive the second signal in the above-described timing.

Further, according to an embodiment of the disclosure, the base station controller 1910 may control to generate downlink control information (DCI) including the second signal transmission timing information. In this case, the DCI may indicate the second signal transmission timing information.

Further, for example, the base station controller 1910 may be a circuit, an application-specific circuit, or at least one processor. Further, the operations of the base station can be implemented by providing a memory device in which corresponding program codes are stored on a certain constituent part in the base station. That is, the base station controller 1910 can execute the above-described operations by reading and executing the program codes stored in the memory device through a processor or a central processing unit (CPU).

On the other hand, it is not necessary for the base station controller 1910 and the transceiver 1920 to be implemented by separate devices, and they can be implemented by one constituent part in the form of a single chip. The base station controller 1910 and the transceiver 1920 may be electrically connected to each other.

The above-described operations of the base station or the terminal can be realized by providing a memory device storing therein corresponding program codes in a certain constituent part in the base station or the terminal device. That is, the controller of the base station or the terminal device can execute the above-described operations by reading and executing the program codes stored in the memory device through a processor or a central processing unit (CPU).

Various constituent parts of an entity, base station, or terminal device as described above and modules may operate using hardware circuits, for example, a complementary metal oxide semiconductor based logic circuit, firmware, software, and/or hardware and firmware and/or software combinations inserted in a machine readable medium. As an example, various electric structures and methods can be embodied using transistors, logic gates, and electric circuits such as application specific integrated circuits.

Embodiments disclosed in this specification and drawings are illustrated to present only specific examples in order to clarify the technical contents of the disclosure and help understanding of the disclosure, but they are not intended to limit the scope of the disclosure. That is, it will be apparent to those of ordinary skill in the art to which the disclosure pertains that other modified examples that are based on the technical idea of the disclosure can be embodied. Further, according to circumstances, the respective embodiments may be operated in combination. For example, parts of the first, second, and third embodiments of the disclosure may be combined with each other to operate the base station and the terminal. Further, although the above-described embodiments are presented based on an NR system, other modified examples based on the technical idea of the above-described embodiments can be embodied in other systems, such as FDD and TDD LTE systems.

Embodiments disclosed in this specification and drawings are to present only specific examples in order to clarify the technical contents of the disclosure and help understanding of the disclosure and are not intended to limit the scope of the disclosure. That is, it will be apparent to those of ordinary skill in the art to which the disclosure pertains that other modified examples that are based on the technical idea of the disclosure can be embodied.

Although preferred embodiments of the disclosure have been described in the specification and drawings and specific wordings have been used, these are merely used as general meanings to assist those of ordinary skill in the art to gain a comprehensive understanding of the disclosure and do not limit the scope of the disclosure. It will be apparent to those of ordinary skill in the art to which the disclosure pertains that various modifications are possible based on the technical concept of the disclosure in addition to the embodiments disclosed herein.

The invention claimed is:

1. A method performed by a first transceiver in a wireless communication system, the method comprising:
    transmitting, to a second transceiver, first control information including information on a control information type, wherein the information on the control information type indicates whether a type of second control information is a first type or a second type; and
    transmitting, to the second transceiver, the second control information with the type based on the information on the control information type, wherein hybrid automatic repeat request (HARQ) process number and a redundancy version (RV) are included in the second control information,
    wherein a resource for transmission of the first control information is not used for transmission of the second control information,
    wherein the first control information is transmitted on a control channel and the second control information is transmitted on a data channel, and
    wherein second control information of the first type and second control information of the second type comprise different information elements and have different numbers of bits.

2. The method of claim 1, further comprising:
    transmitting, to the second transceiver, data according to the first control information and the second control information.

3. The method of claim 1, wherein type information of the first control information is defined based on a radio resource control (RRC) signaling.

4. The method of claim 3, wherein a number of the type of the second control information is predefined.

5. A method performed by a second transceiver in a wireless communication system, the method comprising:
    receiving, from a first transceiver, first control information including information on control information type, wherein the information on the control information type indicates whether a type of second control information is a first type or a second type; and
    receiving, from the first transceiver, the second control information with the type based on the information on the control information type, wherein hybrid automatic repeat request (HARQ) process number and a redundancy version (RV) are included in the second control information,
    wherein a resource for transmission of the first control information is not used for transmission of the second control information,
    wherein the first control information is received on a control channel and the second control information is received on a data channel, and
    wherein second control information of the first type and second control information of the second type comprise different information elements and have different numbers of bits.

6. The method of claim 5, further comprising:
    receiving, from the first transceiver, data according to the first control information and the second control information.

7. The method of claim 5, wherein type information of the first control information is defined based on a radio resource control (RRC) signaling.

8. The method of claim 7, wherein a number of the type of the second control information is predefined.

9. A first transceiver in a wireless communication system, the first transceiver comprising:
    a controller configured to:
        transmit, to a second transceiver via a transmitter, first control information including information on a control information type, wherein the information on the control information type indicates whether a type of second control information is a first type or a second type, and
        transmit, to the second transceiver via the transmitter, the second control information with the type based on the information on the control information type, wherein hybrid automatic repeat request (HARQ)

process number and a redundancy version (RV) are included in the second control information, wherein a resource for transmission of the first control information is not used for transmission of the second control information, wherein the first control information is transmitted on a control channel and the second control information is transmitted on a data channel, and wherein second control information of the first type and second control information of the second type comprise different information elements and have different numbers of bits.

10. The first transceiver of claim 9, wherein the controller is configured to:

transmit, to the second transceiver via the transmitter, data according to the first control information and the second control information.

11. The first transceiver of claim 9, wherein type information of the first control information is defined based on a radio resource control (RRC) signaling.

12. The first transceiver of claim 11, wherein a number of the type of the second control information is predefined.

13. A second transceiver in a wireless communication system, the second transceiver comprising:

a controller configured to:

receive, from a first transceiver via a receiver, first control information including information on a control information type, wherein the information on the control information type indicates whether a type of second control information is a first type or a second type, and receive, from the first transceiver via the receiver, the second control information with the type based on the information on the control information type, wherein hybrid automatic repeat request (HARQ) process number and a redundancy version (RV) are included in the second control information, wherein a resource for transmission of the first control information is not used for transmission of the second control information, wherein the first control information is received on a control channel and the second control information is received on a data channel, and wherein second control information of the first type and second control information of the second type comprise different information elements and have different numbers of bits.

14. The second transceiver of claim 13, wherein the controller is configured to:

receive, from the first transceiver via the receiver, data according to the first control information and the second control information.

15. The second transceiver of claim 13, wherein a number of the type of the second control information is predefined.

16. The second transceiver of claim 13, wherein type information of the first control information is defined based on a radio resource control (RRC) signaling.

* * * * *